United States Patent
Oga et al.

(10) Patent No.: US 9,616,827 B2
(45) Date of Patent: Apr. 11, 2017

(54) WIRE HARNESS

(71) Applicant: Yazaki Corporation, Tokyo (JP)

(72) Inventors: Tatsuya Oga, Makinohara (JP); Hideomi Adachi, Makinohara (JP)

(73) Assignee: Yazaki Corporation, Minato-ku, Tokyo (JP)

(*) Notice: Subject to any disclaimer, the term of this patent is extended or adjusted under 35 U.S.C. 154(b) by 0 days.

(21) Appl. No.: 14/812,407

(22) Filed: Jul. 29, 2015

(65) Prior Publication Data

US 2016/0031392 A1 Feb. 4, 2016

(30) Foreign Application Priority Data

Jul. 30, 2014 (JP) .................................. 2014-154547
Jul. 30, 2014 (JP) .................................. 2014-154548

(51) Int. Cl.
B60R 16/02 (2006.01)

(52) U.S. Cl.
CPC ................................ B60R 16/0215 (2013.01)

(58) Field of Classification Search
USPC .............................. 174/72 A, 68.1; 439/207
See application file for complete search history.

(56) References Cited

U.S. PATENT DOCUMENTS 6,129,120 A 10/2000 Margot
6,164,338 A 12/2000 Holzer et al.
2004/0154817 A1 8/2004 Sudo et al.
2011/0155458 A1* 6/2011 Kato .................... B60R 16/0215
174/74 R
2015/0014017 A1 1/2015 Sugimoto et al.
2015/0287497 A1* 10/2015 Shiga .................. B60R 16/0215
174/84 R

FOREIGN PATENT DOCUMENTS

DE        198 15 137 A1    10/1999
DE        103 57 976 A1    7/2004
DE     11 2013 004 193 T5  5/2015
JP         2013211963 A    10/2013
WO         2014/034591 A1  3/2014

OTHER PUBLICATIONS

Communication dated Jul. 26, 2016 issued by German Intellectual Property Office in counterpart German Application No. 10 2015 214 510.7.

* cited by examiner

Primary Examiner — Dhirubhai R Patel
(74) Attorney, Agent, or Firm — Sughrue Mion, PLLC

(57) ABSTRACT

A wire harness includes a plurality of electrical pathways or a plurality of circuits of electrical pathways, and an exterior member into which the electrical pathways are inserted and which protects the electrical pathways. The exterior member is formed by being resin molded into a single pipe-like shape, and has at least one of irregular portions in a pipe axial direction. The irregular portion has a first irregular pipe pan, a second irregular pipe part which is different in shape from the first irregular pipe part and a shape converting part which links the first irregular pipe part and the second irregular pipe part. The shape converting part is formed as a part which extends a predetermined length in the pipe axial direction to straightly wire the wire harness.

8 Claims, 16 Drawing Sheets

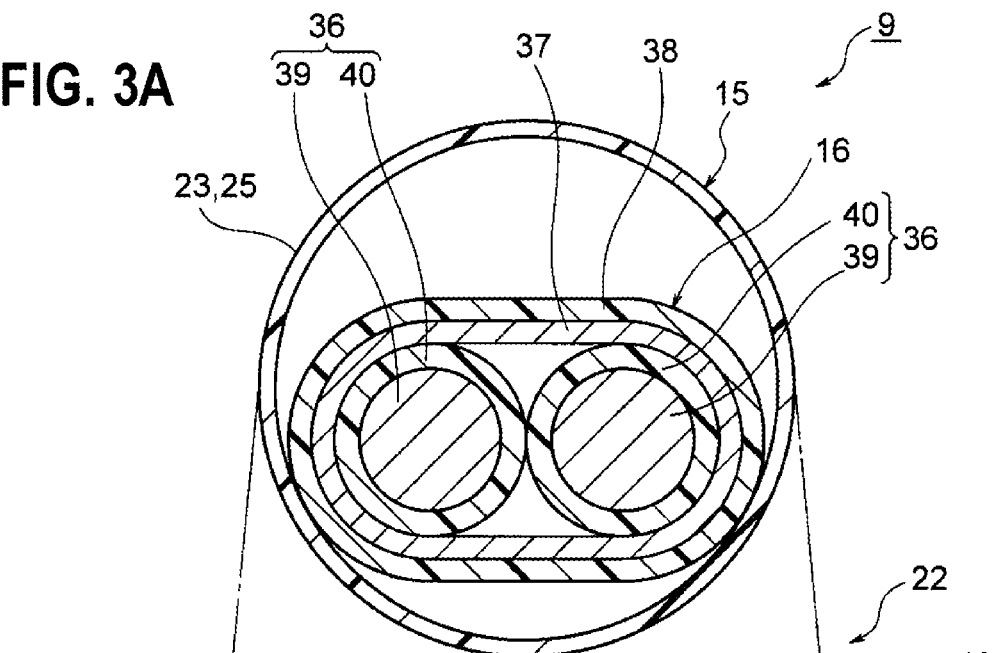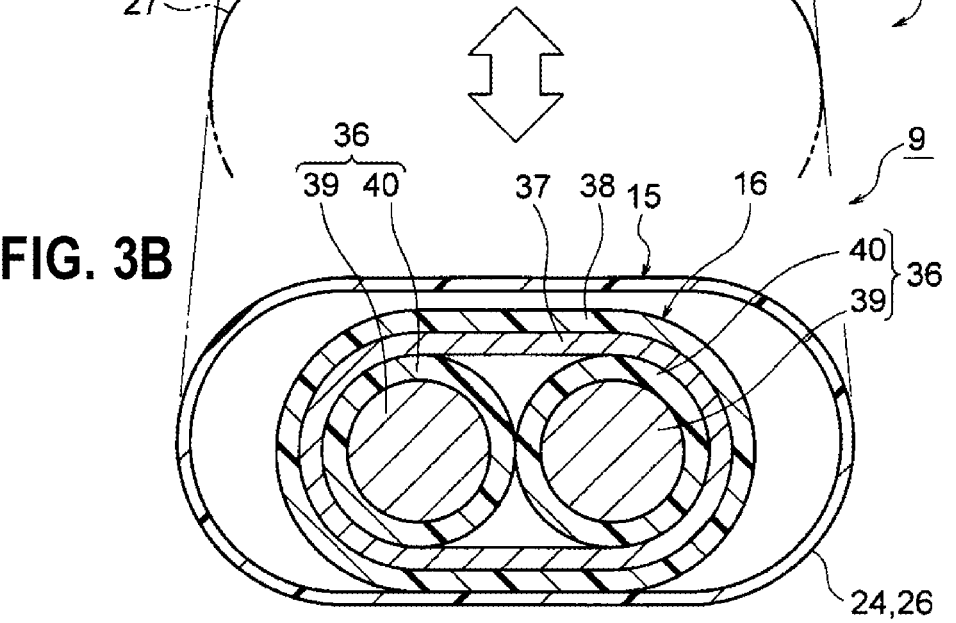

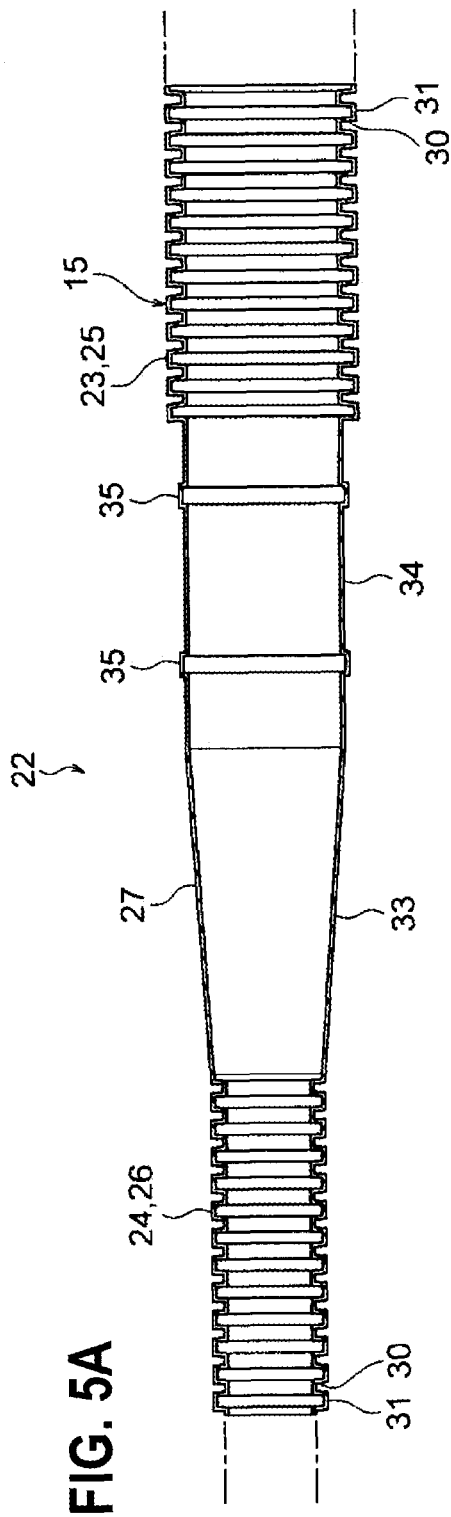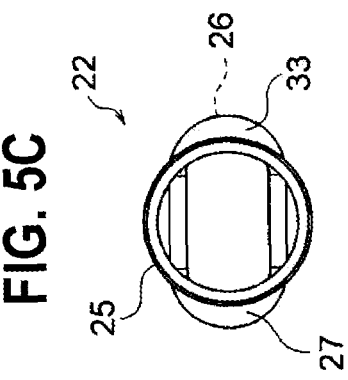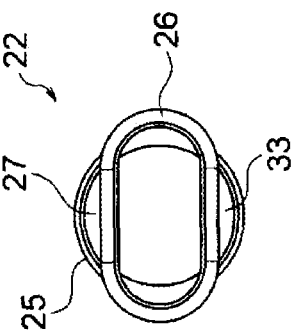

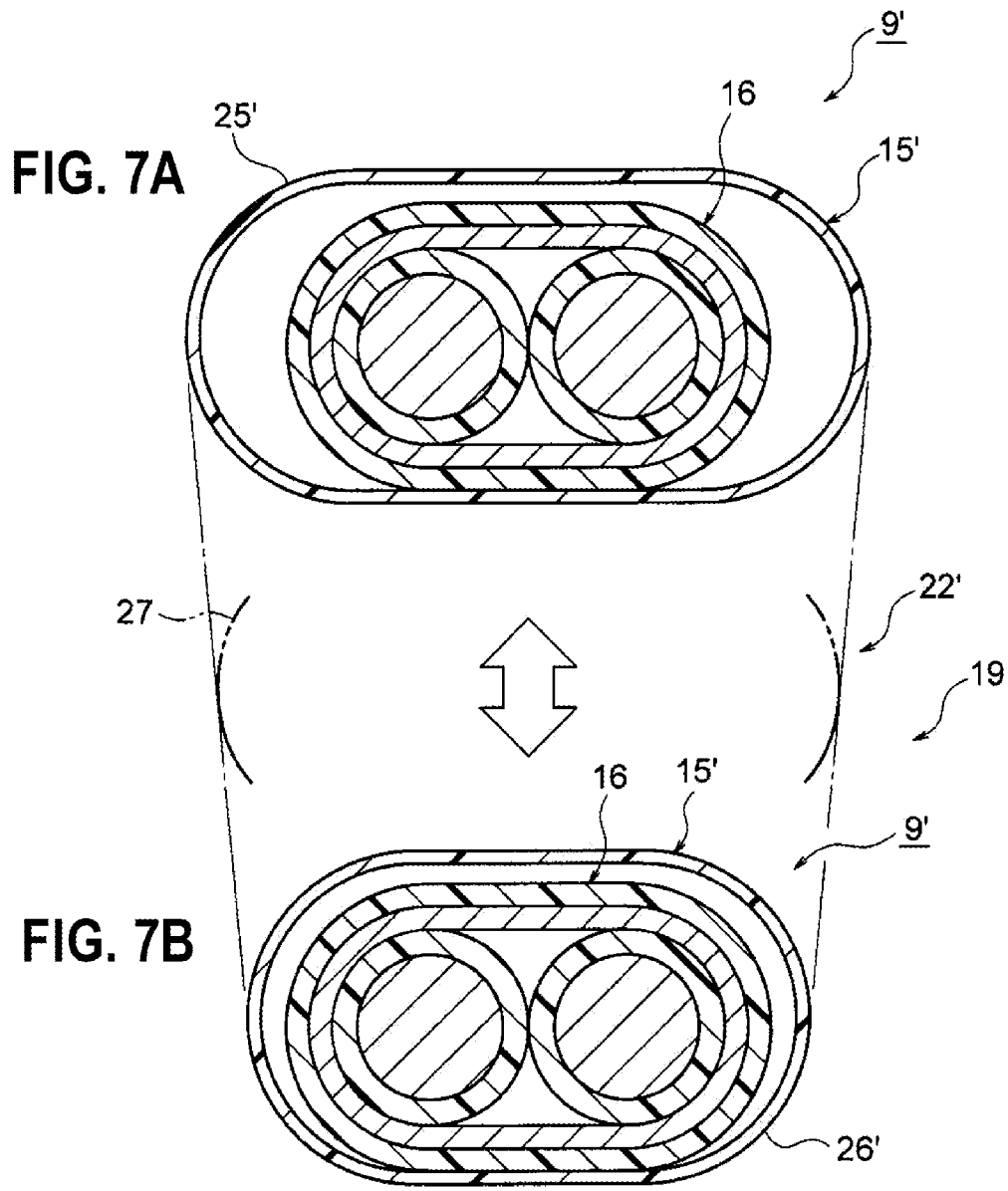

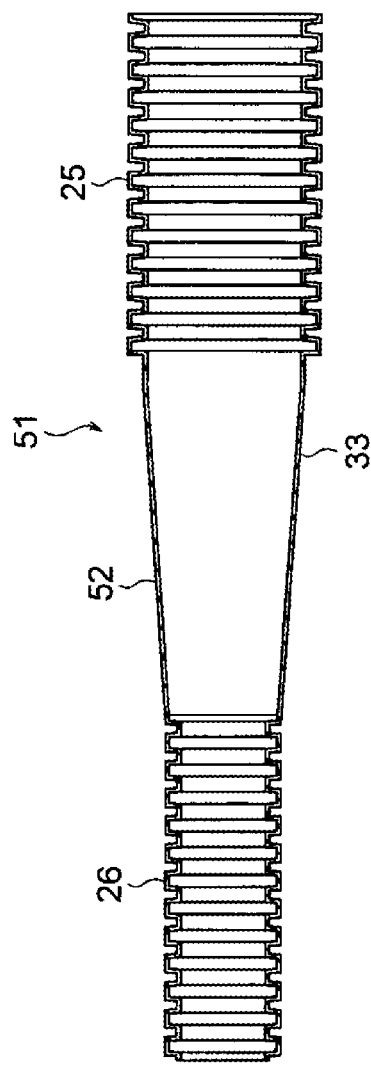
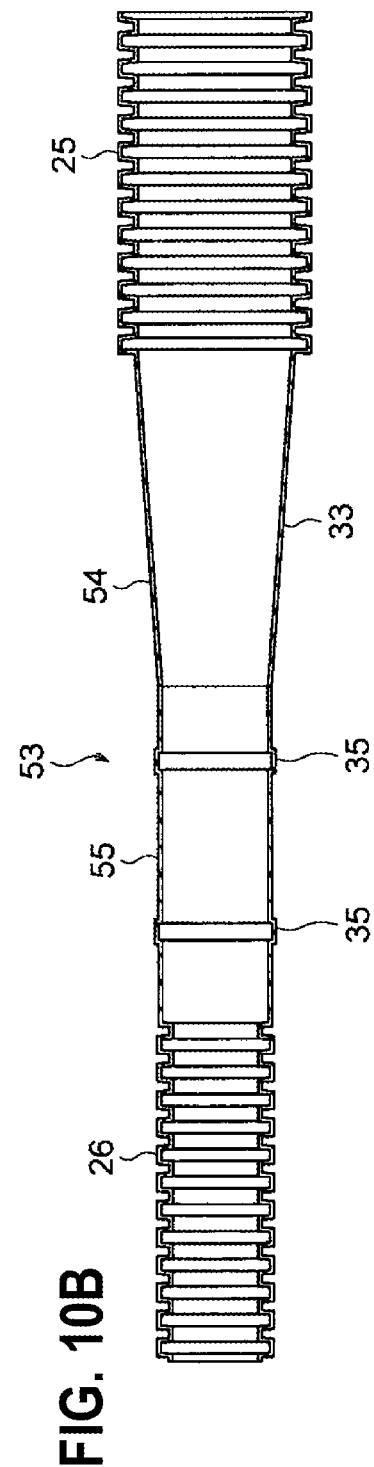
FIG. 10A
FIG. 10B

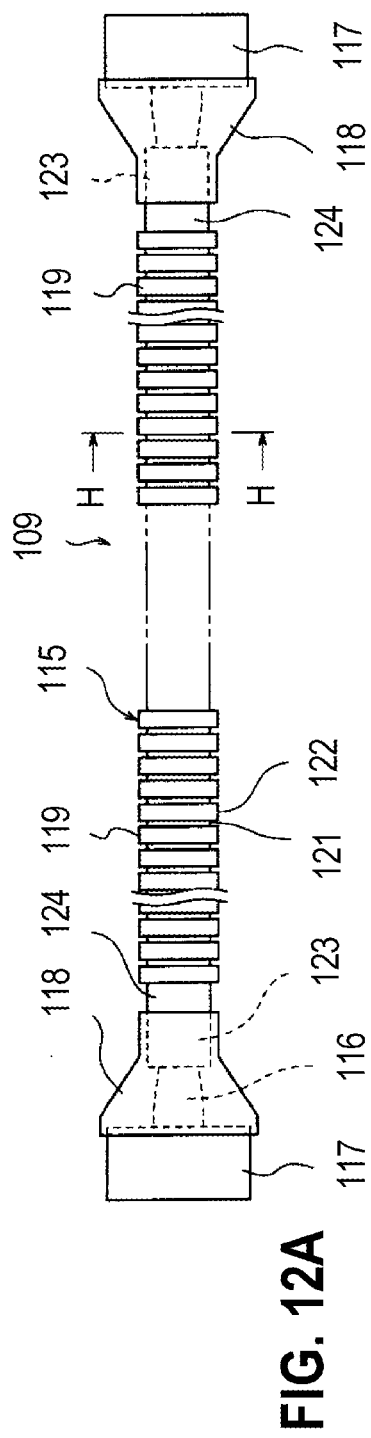
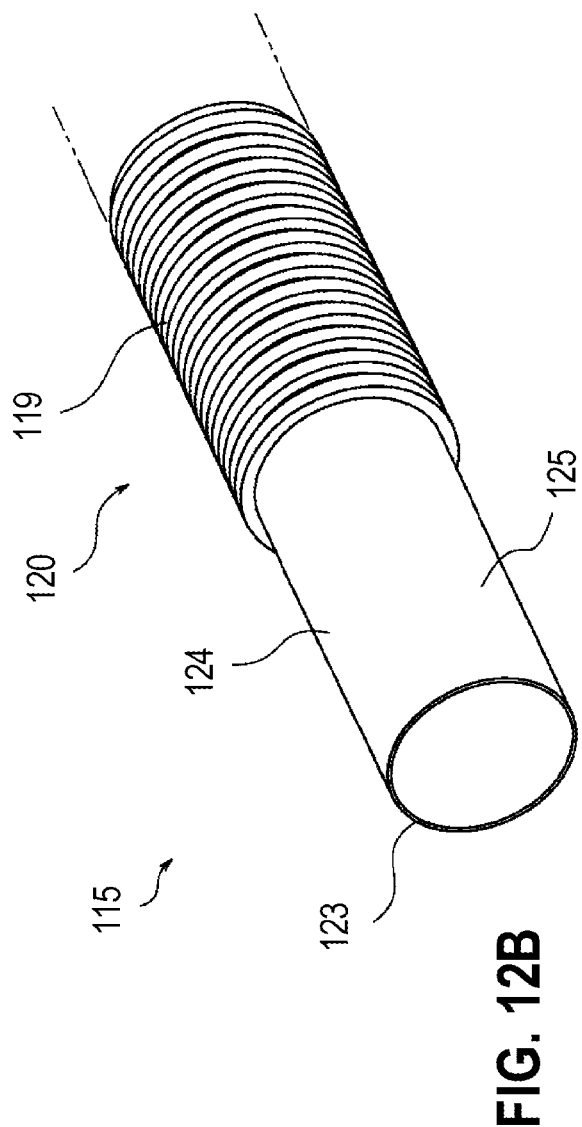
FIG. 12A
FIG. 12B

WIRE HARNESS

CROSS-REFERENCE TO RELATED APPLICATIONS

This application claims the benefit of Japanese Patent Applications Nos. 2014-154547 (filed on Jul. 30, 2014) and 2014-154548 (filed on Jul. 30, 2014), the contents of which are incorporated herein by reference.

BACKGROUND

1. Technical Field

The present invention relates to a wire harness which includes an electrical pathway and an exterior member. The present invention relates to a wire harness which includes a plurality of electrical pathways or a plurality of circuits of electrical pathways, and an exterior member into which the electrical pathways are inserted and which protects the electrical pathways, and particularly to a wire harness which has an exterior member that is formed of resin into a single pipe-like shape and that has one or a plurality of irregular portions in the pipe axial direction.

2. Related Art

A traditional wire harness is known which electrically connects, for example, high voltage apparatuses that are carried in a hybrid vehicle or an electric vehicle. When a recent trend is watched, the wire harness that has such a constitution and structure that wiring space is considered or component number reduction is considered is adopted.

A wire harness disclosed in JP-A-2013-211963 includes an electrical pathway and an exterior member made of synthetic resin to protect the electrical pathway. The wire harness has features in the exterior member, and has an effective structure when the wire harness is wired in a small space or a three-dimensional complicated space.

A wire harness disclosed in JP-A-2013-211963 includes an electrical pathway and an exterior member made of synthetic resin to protect the electrical pathway. The exterior member is formed into a single long pipe-like shape, and the electrical pathway is inserted from one end of the exterior member to the other end of the exterior member. After the electrical pathway is inserted, connectors are attached to the terminals of the electrical pathway that is derived from the terminals of the exterior member.

The exterior member of the wire harness disclosed in JP-A-2013-211963 has a bellows pipe part of a round (or flat) cross section and a straight pipe part of a flat cross section, and is formed into a single pipe-like shape by being resin molded to make the round bellows pipe part and the flat straight pipe part consecutive. Therefore, when the exterior member is adopted, even in a small space, it is possible to wire the wire harness if the flat straight pipe part is arranged. Further, even in a three-dimensional complicated space, it is also possible to wire the wire harness if the round (or flat) bellows pipe part is arranged.

However, when the bellows pipe part is watched, because the cross section of the above bellows pipe part is uniform, if the wiring space varies at different sites, there is a problem which is that it is difficult to cope with the issue. Further, because the cross section is uniform, if it is intended to exhibit different flexure performances, there is also a problem which is that it is difficult to cope with the issue.

Thus, the inventors of the present application attempted to, for example, change the cross section of the above bellows pipe part to solve the above problems. However, because the shape of the changed part becomes distorted, and the changed part itself has flexibility, it is found that there is a trouble which is that the flexure performance before and after the changed part becomes unstable.

The present invention is made in view of the above situations, and an object of the present invention is to provide a wire harness which, even if the wiring space varies at different sites, can cope with the issue. Further, another object of the present invention is to provide a wire harness which can make different flexure performances to be exhibited in a stable state.

Because the exterior member of the wire harness disclosed in JP-A-2013-211963 is resin-molded into a single, long pipe-like shape, water invasion is prevented in the middle portion. However, preventive measures against water invasion at the terminals of the exterior member are insufficient. Thus, the inventors of the present application attempted to attach, for example, rubber boots to the terminals of the exterior member to cover the terminals of the exterior member, but because those parts of the exterior member that include the terminals, namely, the parts corresponding to the harness terminals have a bellows pipe shape, it is found that there is a problem which is that adherence to waterproofing members such as the boots is bad.

The present invention is made in view of the above situations, and the object of the present invention is to provide a wire harness so that the adherence of an exterior member and waterproofing members can be improved.

SUMMARY (1) According to an aspect of the invention, a wire harness includes:

a plurality of electrical pathways or a plurality of circuits of electrical pathways; and an exterior member into which the electrical pathways are inserted and which protects the electrical pathways, wherein the exterior member is formed by being resin molded into a single pipe-like shape, and has at least one of irregular portions in a pipe axial direction, the irregular portion has:
a first irregular pipe part;
a second irregular pipe part which is different in shape from the first irregular pipe part; and
a shape converting part which links the first irregular pipe part and the second irregular pipe part, and the shape converting part is formed as a part which extends a predetermined length in the pipe axial direction to straightly wire the wire harness.

(2) In the wire harness of (1), the difference in shape is at least one of a difference in cross section, a difference in size and a difference in twisting direction.

(3) In the wire harness of (1) or (2), the shape converting part has a body part as a part to convert shape, and directly links the first irregular pipe part at one end of the body part, or links the first irregular pipe part through a first linking pipe part which is formed at one end of the body part.

(4) In the wire harness of (3), the shape converting part directly links the second irregular pipe part at the other end of the body part, or links the second irregular pipe part through a second linking pipe part which is formed at the other end of the body part.

(5) In the wire harness of any one of (1) to (4), the irregular portions are formed in ranges where the wire harness has flexibility and is bendably wired.

According to the present invention having the above features, even if the wiring space varies in different sites, for example, there is a small space partially, it is possible to make the irregular portion of the exterior member cope with this issue. Further, according to the present invention, for example, if it is intended to exhibit different flexure performances in a stable state, it is possible to make the irregular portion of the exterior member to correspond to a portion where the exhibition is intended. Furthermore, according to the present invention, the irregular portion may be formed by changing form, size or direction. That is, the first irregular pipe part and the second irregular pipe part may be formed whose form, size or direction is changed.

(6) According to another aspect of the invention, a wire harness includes:
an electrical pathway; and
an exterior member into which the electrical pathway is inserted, which protects the electrical pathway, which is formed into a pipe-like shape by being resin molded, and which is formed into a bellows pipe shape at harness terminal corresponding parts,
wherein a terminal in the harness terminal corresponding parts is formed into a straight pipe part of a round cross section whose shape is converted from the bellows pipe shape.

(7) In the harness of (6), a waterproofing member is attached to adhere to the outer surface of the straight pipe part, and is fixed with a fastening member.

(8) In the wire harness of (7), a retaining part of the waterproofing member is formed on the outer surface of the straight pipe part.

According to the present invention described in (1), because the exterior member that has one or a plurality of irregular portions in the pipe axial direction is adopted, if the irregular portions are arranged at desired positions, an effect is played that the wire harness can be wired, even if wiring space varies at different sites, for example, there is a small space partially. Further, according to the present invention, because the structure that the shape converting part is arranged between the first irregular pipe part and the second irregular pipe part is adopted in the irregular portion, for example, when it is intended to exhibit different flexure performances at the side of the first irregular pipe part and at the side of the second irregular pipe part, the electrical pathway can be fixed at the shape converting part. As a result, an effect is played that the different flexure characteristics before and after the shape converting part can be exhibited in a stable state.

According to the present invention described in (2), because the irregular portion in the exterior member is formed by changing form, size or direction, an effect is played that it is possible to provide a wire harness in consideration of wiring space.

According to the present invention described in (3), because the shape converting part in the irregular portion has the body part formed as a part converting shape between the first irregular pipe part and the second irregular pipe part, an effect is played that it is possible to make shape conversion immediately by directly linking the first irregular pipe part to one end of the body part. On the other hand, when the first linking pipe part is formed to follow one end of the body part and the first irregular pipe part is linked through the first linking pipe part, an effect is played that it is possible to make smooth shape conversion correspondingly.

According to the present invention described in (4), an effect is played that it is possible to make shape conversion immediately by directly linking the second irregular pipe part to the other end of the body part in the shape converting part. On the other hand, when the second linking pipe part is formed to follow the other end of the body part and the second irregular pipe part is linked through the second linking pipe part, an effect is played that it is possible to make smooth shape conversion correspondingly.

According to the present invention described in (5), an effect is played that different flexure performances can be exhibited in a stable state in ranges where the wire harness has flexibility and is bendably wired.

According to the present invention described in (6), because the terminal in the harness terminal corresponding parts of the exterior member becomes the straight pipe part of a round cross section whose shape is converted from the bellows pipe shape, an effect is played that it is possible to make the waterproofing member such as a boot or a grommet adhere at more surfaces. Therefore, according to the present invention, an effect is played that, in comparison with the terminal of the traditional bellows pipe shape, the adherence with the waterproofing member can be improved.

According to the present invention described in (7), because the waterproofing member is fixed with the fastening member, an effect is played that it is possible to improve the adherence or maintain waterproofness (watertight property).

According to the present invention described in (8), because the dropout of the waterproofing member is prevented, an effect is played that it is possible to maintain the adherence with the waterproofing member.

BRIEF DESCRIPTION OF THE DRAWINGS

FIGS. 3A and 3B include sectional views of the wire harness, in which FIG. 3A is an A-A line sectional view of FIG. 2, and FIG. 3B is a B-B line sectional view of FIG. 2 (embodiment 1).

FIGS. 5A to 5C include sectional views of the exterior member of FIG. 4, in which FIG. 5A is an E-E sectional view, FIG. 5B is a view watched from an arrow F in FIG. 4, and FIG. 5C is a view watched from an arrow G in FIG. 4 (embodiment 1).

FIGS. 7A and 7B are sectional views which indicate a first variation of the exterior member of FIGS. 3A and 3B (embodiment 2).

FIGS. 10A and 10B are sectional views which indicate various variations of irregular portions of FIGS. 5A and 5B (embodiment 5).

FIG. 12A is a top view which indicates the constitution of the wire harness, and FIG. 12B is an enlarged perspective view of a terminal of an exterior member (embodiment 6).

FIGS. 15A and 15B include figures which indicate a variation of the terminal of the exterior member, in which FIG. 15A is an enlarged perspective view, and FIG. 15B is a sectional view of FIG. 15A (embodiment 7).

FIGS. 16A and 16B include figures which indicate a variation of the terminal of the exterior member, in which FIG. 16A is an enlarged perspective view, and FIG. 16B is a sectional view of FIG. 16A (embodiment 8).

DETAILED DESCRIPTION

The wire harness adopts an exterior member having the following portion in ranges where the wire harness has flexibility and is bendably wired. That is, an exterior member is adopted which has one or a plurality of irregular portions in the pipe axial direction as portions that can cope with an issue that the wiring space varies at different sites. The irregular portion has a first irregular pipe part, a second irregular pipe part which is different in shape from the first irregular pipe part, and a shape converting part which links the first irregular pipe part and the second irregular pipe part, and the shape converting part is formed as a part which extends a predetermined length in the pipe axial direction to straightly wire the wire harness. The irregular portion is formed by changing form, size and direction to make the first irregular pipe part different in shape from the second irregular pipe part.

Embodiment 1

Figure 1:
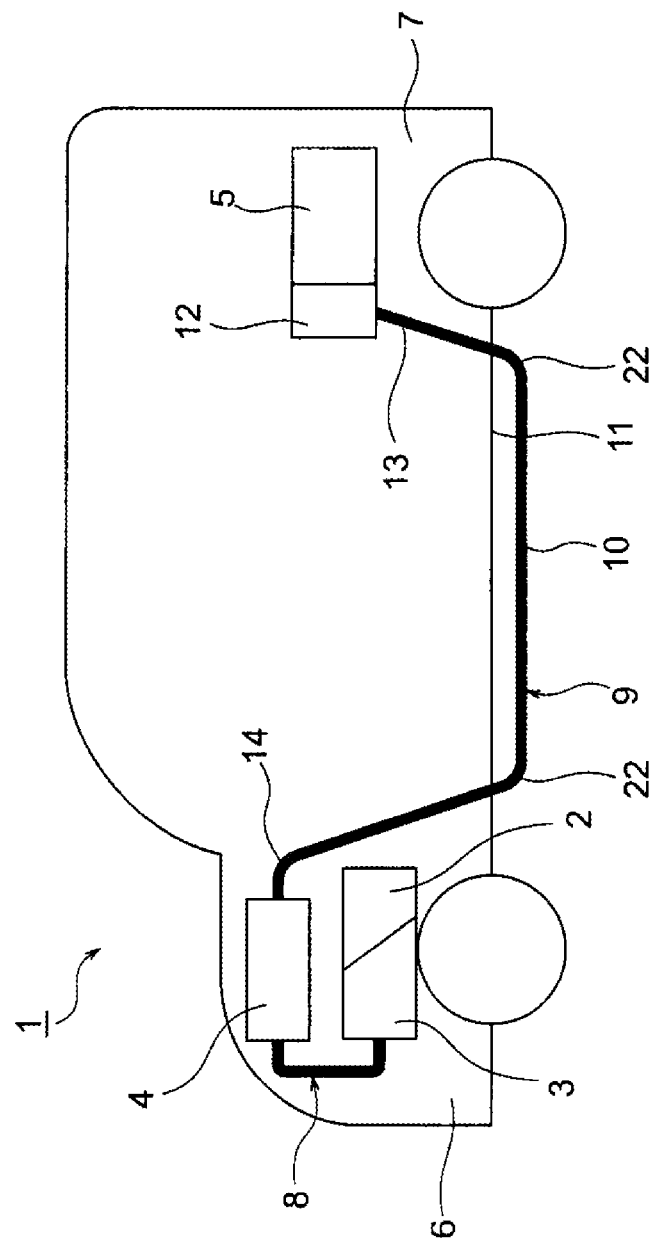
FIG. 1 is a schematic view which indicates that a wire harness of the present invention is wired (embodiment 1).
Figure 2:
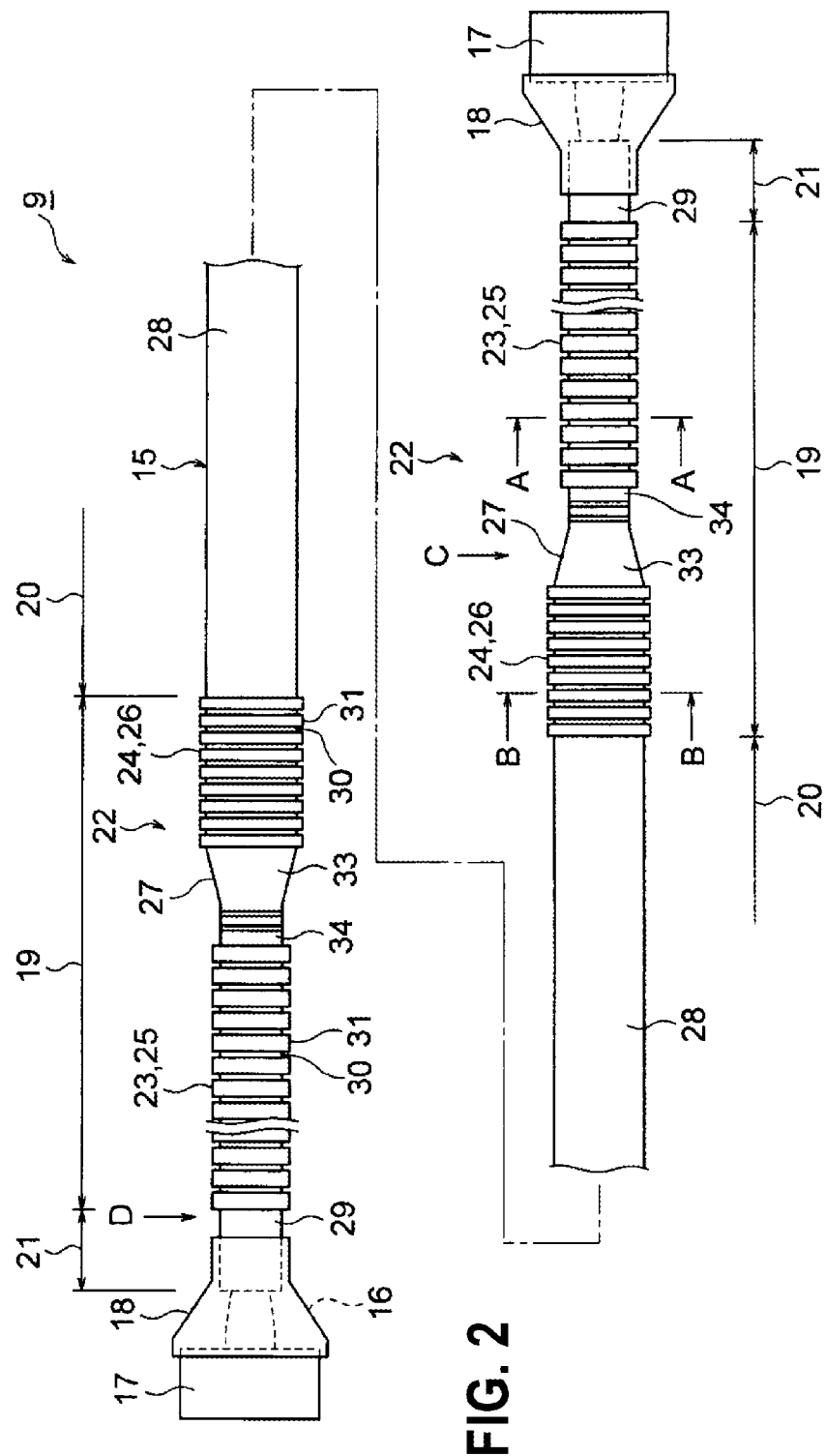
FIG. 2 is a top view which indicates the constitution of the wire harness (embodiment 1).

An embodiment 1 is described with reference to the figures as follows. FIG. 1 is a schematic view which indicates that a wire harness of the present invention is wired. FIG. 2 is a top view which indicates the constitution of the wire harness. FIGS. 3A and 3B include sectional views of the wire harness, in which FIG. 3A is an A-A line sectional view of FIG. 2, and FIG. 3B is a B-B line sectional view of FIG. 2.

Figure 4:
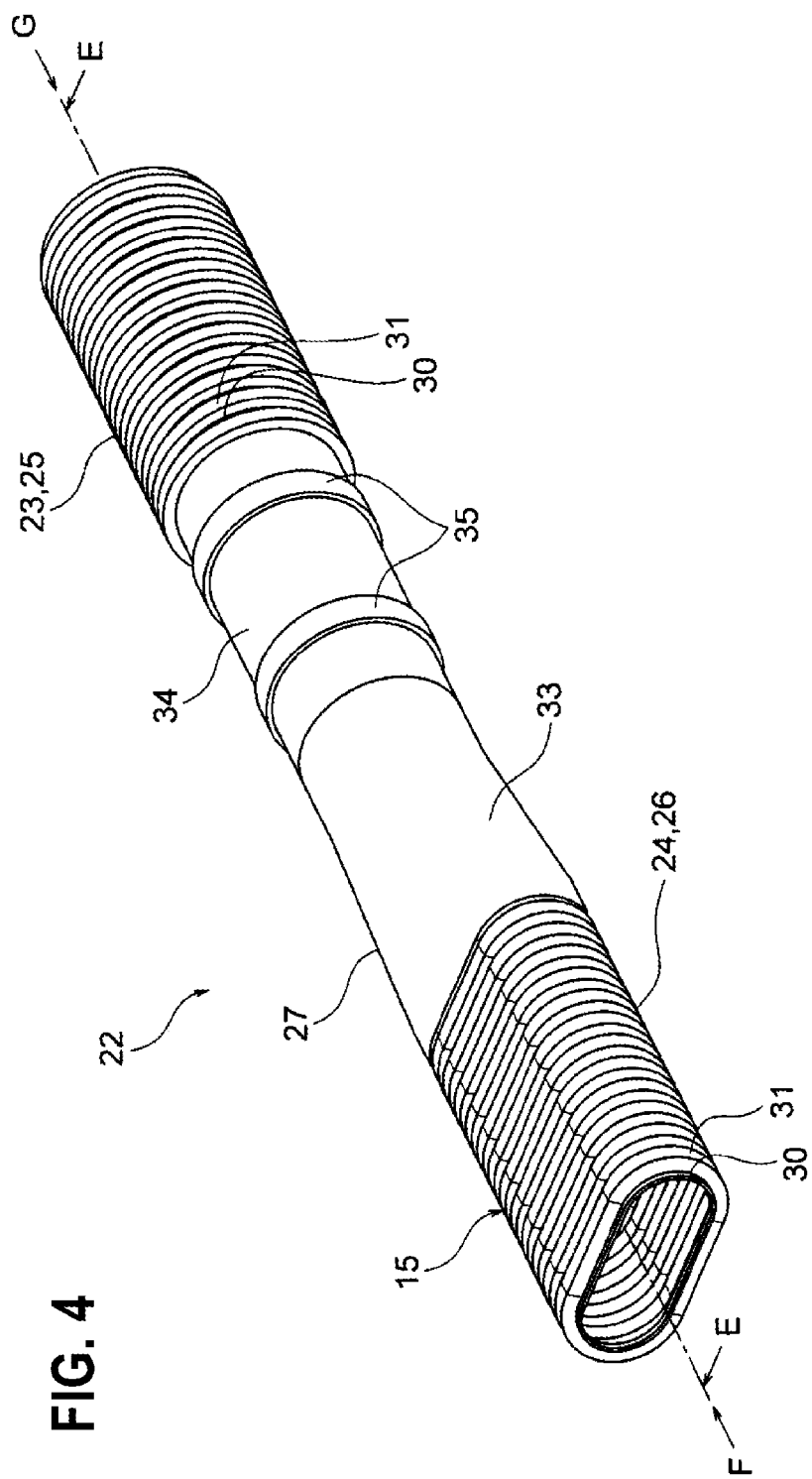
FIG. 4 is a perspective view of portions corresponding to an arrow C of an exterior member of FIG. 2 (embodiment 1).
Figure 6A:
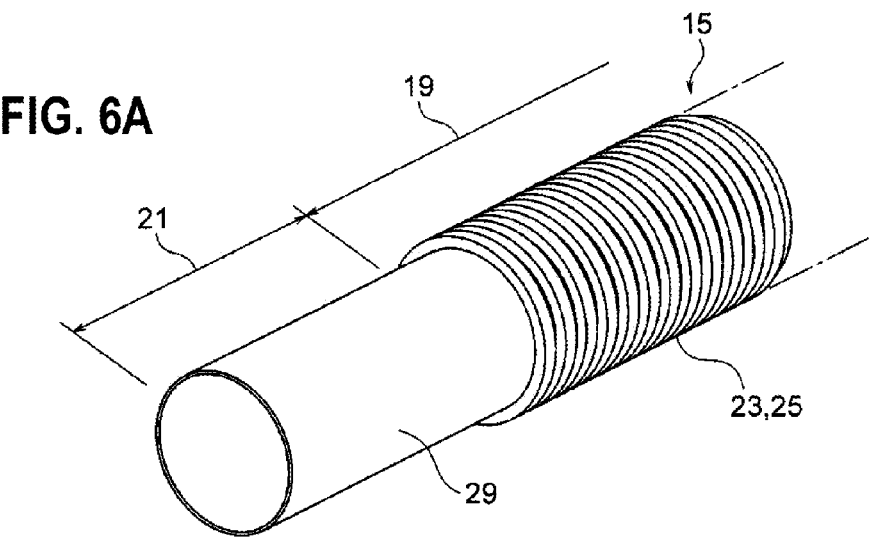
FIG. 6A is a perspective view of portions corresponding to arrow D of the exterior member of FIG. 2.
Figure 6B:
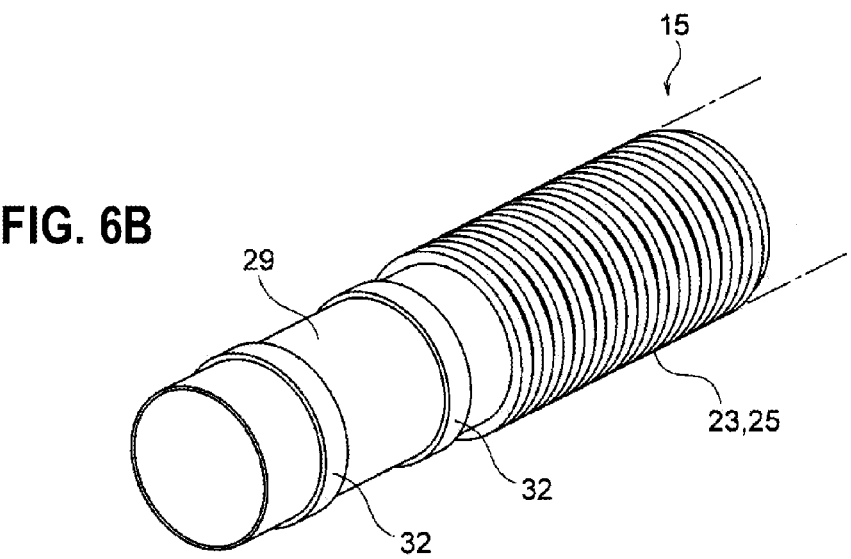
FIG. 6B is a figure of a variation of FIG. 6A (embodiment 1).

FIG. 4 is a perspective view of portions corresponding to an arrow C of an exterior member of FIG. 2. FIGS. 5A and 5B include sectional views of the exterior member of FIG. 4, in which FIG. 5A is an E-E sectional view, FIG. 5B is a view watched from an arrow F in FIG. 4, and FIG. 5C is a view watched from an arrow G in FIG. 4. FIG. 6A is a perspective view of portions corresponding to arrow D of the exterior member of FIG. 2, and FIG. 6B is a figure of a variation of FIG. 6A.

In the present embodiment, the present invention is applied to a wire harness which is wired in a hybrid vehicle (or an electric vehicle or a general vehicle).

In FIG. 1, a reference sign 1 indicates a hybrid vehicle. The hybrid vehicle 1 is a vehicle which is driven by mixing two powers of an engine 2 and a motor unit 3, and the electric power from a battery 5 (battery pack) will be supplied to the motor unit 3 via an inverter unit 4. The engine 2, the motor unit 3 and the inverter unit 4 are carried in an engine room 6 at the position of front wheels and the like in the embodiment. The battery 5 is carried in a vehicle rear part 7 of rear wheels and the like (it is also possible that the battery 5 is carried in a vehicle indoor room which is behind an engine room 6).

The motor unit 3 and the inverter unit 4 are connected by a high voltage wire harness 8. The battery 5 and the inverter unit 4 are also connected by a high voltage wire harness 9. A middle part 10 of the wire harness 9 is wired below a vehicle floor 11. The wire harness 9 is wired substantially in parallel with the vehicle floor 11. The vehicle floor 11 is a well-known body and is a so-called panel member, and through holes are formed at predetermined positions. The wire harness 9 is inserted through these through holes watertightly.

The wire harness 9 and the battery 5 are connected through a junction block 12 which the battery 5 is provided with. A back end 13 of the wire harness 9 is electrically connected to the junction block 12 with a well-known method. A front end 14 of the wire harness 9 is electrically connected to the inverter unit 4 with a well-known method.

The motor unit 3 includes a motor and a generator in structure. The inverter unit 4 includes an inverter and a converter in structure. The motor unit 3 is formed as a motor assembly including a shielding case. The inverter unit 4 is also formed as an inverter assembly including a shielding case. The battery 5 is a Ni-MH battery or Li-ion battery, and is modulated. Further, for example, an electric power storage device such as a capacitor may be used. The battery 5 shall not be particularly limited as long as the battery 5 may be used for the hybrid vehicle 1 or an electric vehicle.

In FIG. 2, the wire harness 9 according to the present invention includes an exterior member 15, a high voltage electrical pathway 16 (electrical pathway) which is accommodated and protected in the exterior member 15, shield connectors 17 which are provided at the above front end 14 and the above back end 13 which are harness terminals, boots 18 which are provided at the front end 14 and the back end 13, and a plurality of clamps (fixing members whose illustration is omitted) which are attached to the outer surface of the exterior member 15, and a grommet (waterproofing member whose illustration is omitted) which is watertightly attached to the outer surface of the exterior member 15.

Further, the wire harness 9 may have such a structure and constitution that a low voltage electrical pathway is accommodated and protected in the exterior member 15 together with the high voltage electrical pathway 16.

The exterior member 15 is formed into a single straight pipe-like shape by being resin molded (straight before use). Ranges (bendable wiring ranges 19, 19) where the exterior member 15 has flexibility and may be bendably wired, a range (straight wiring range 20) where the exterior member 15 is wired straightly, and boot attaching ranges 21 are set in the exterior member 15 (the range setting in the figure is only one example).

The exterior member 15 is formed with irregular portions 22, 22, which are feathers of the present invention, in the ranges that are set as the bendable wiring ranges 19, 19.

In the bendable wiring ranges 19, 19, flexible pipe parts 23, 24 which have flexibility are formed. These flexible pipe parts 23, 24 are formed into irregular shapes in the pipe axial direction. In the bendable wiring ranges 19, the linking portions that link the flexible pipe pans 23, 24 and the portions around the linking portions correspond to the above irregular portions 22. The irregular portion 22 has a first irregular pipe part 25, a second irregular pipe part 26, and a shape converting part 27. In the present embodiment, the flexible pipe part 23 corresponds to the first irregular pipe part 25, and the flexible pipe part 24 corresponds to the second irregular pipe part 26.

On the other hand, in the straight wiring range 20, a straight pipe part 28 as a part to be wired straightly is formed. In the straight wiring range 20, the whole exterior member 15 is formed into the shape of the straight pipe part 28. In the boot attaching ranges 21, the exterior member 15 is formed into the shape of straight pipe parts 29.

Each component of the exterior member 15 is described in detail as follows.

The flexible pipe parts 23, 24 are formed as parts that have flexibility as described above. The flexible pipe pans 23, 24 are disposed in accordance with a vehicle attaching shape (the shape of a wire harness wiring target. The shape of a fixed target). The flexible pipe parts 23, 24 are formed to have lengths in accordance with the vehicle attaching shape (the lengths are not constant, but the flexible pipe parts 23, 24 are formed to have necessary lengths in accordance with the vehicle attaching shape, respectively). The flexible pipe parts 23, 24 are flexed at desired angles, respectively, when the wire harness 9 is packed or transported and the wire harness 9 is wired along courses to the vehicle. The flexible pipe parts 23, 24 are so formed that it is possible to flex the flexible pipe parts 23, 24 into bent shapes and it is possible, of course, to return to the straight original states (states when the flexible pipe parts 23, 24 are resin-molded) as shown in the figures.

The flexible pipe parts 23, 24 are formed into a bellows pipe shape in the embodiment (if the flexibility is provided, the shape is not particularly limited). Specifically, the flexible pipe parts 23, 24 are formed to have circumferential furrows 30 and ridges 31, which alternate in the pipe axial direction.

In the embodiment, although not particularly illustrated, it is also possible to have a flexible pipe part that is flexed when the wire harness 9 is wired along courses, and a flexible pipe part that is flexed when the wire harness 9 is packed and transported. In addition, it is also possible to form a flexible pipe part at a part where it is not necessary to flex when the wire harness 9 is wired along courses, but where it is necessary to flex when the wire harness 9 is packed and transported.

The exterior member 15 is so formed that the flexible pipe parts 23, 24 have a corrugated tube shape in the present embodiment. That is, the exterior member is formed into such a shape that corrugated tubes exist partially. Thus, because the exterior member 15 has the parts of corrugated tubes, the exterior member 15 can be referred to as a "corrugated tube" or a "partially corrugated tube".

In the present embodiment, the exterior member 15 is formed into such a shape that slits are not provided (there are no cuts) along the pipe axial direction. A reason that the slits are not provided is to improve waterproofness by preventing water from invading into the exterior member 15. Another reason is that the high voltage electrical pathway 16 would not protrude, for example, from the flexed parts. Besides, a further reason is to improve the rigidity of the exterior member 15 itself. In addition, the exterior member 15 is formed into such a shape that there are no circumferential seams. The reasons are similar to those of the above slits.

The exterior member 15 may be formed into such a shape that the exterior member 15 can be divided at predetermined positions if the above points can be satisfied. In this case, the exterior member 15 is unified by bonding or welding or by appended members for connecting.

The straight pipe parts 28, 29 are formed as parts which do not have the flexibility of the flexible pipe parts 23, 24. The straight pipe parts 28, 29 are formed as unbent parts that will not bend when the wire harness 9 is packed or transported and is wired along courses (the unbent parts means that the parts do not keep flexibility positively). The straight pipe part 28 is formed into a long straight pipe shape. On the other hand, the straight pipe parts 29 are formed into a short straight pipe shape. Therefore, the straight pipe parts 28, 29 can be referred to as "straight pipe parts" (can be referred to as "inflexible pipe parts").

The straight pipe part 28, 29 are formed into parts that are more rigid than the flexible pipe parts 23, 24. The straight pipe part 28 is formed to have a length and at a position in accordance with the vehicle attaching shape. In the present embodiment, the straight pipe part 28 is formed so that the straight pipe part 28 is arranged under the vehicle floor 11 (refer to FIG. 1). Because the straight pipe part 28 is arranged under the vehicle floor 11, the straight pipe part 28 is formed into such a shape that the distance from the ground can be earned. Specifically, the straight pipe part 28 is formed to have an oval cross section (or an elliptical cross section. A flat shape is desirable). The straight pipe part 28 is so formed that it is possible to extend along, for example, the reinforcement of the vehicle floor 11.

Because the straight pipe part 28 is long and has rigidity, even if course regulating members such as protectors are not used, the course of the wire harness 9 can be regulated by the straight pipe part 28 itself.

On the other hand, the straight pipe parts 29 are formed to have lengths and at positions in accordance with the attaching of the boots 18. When described more in detail with reference to FIGS. 2 and 6, the boots 18 are attached to the straight pipe parts 29. Therefore, in consideration of adherence (watertightness) of the boots 18, the molding of the boots 18 and the like, the straight pipe parts 29 are formed to have a round cross section. The straight pipe parts 29 are formed into such a shape that the outside surfaces are smooth in FIG. 6A. Retaining parts 32, as shown in FIG. 6B are effective as retaining parts of the boots 18. The retaining parts 32 are formed into annular parts that slightly project from the outside surfaces of the straight pipe parts 29 (it is only an example, but not particularly limited as long as the shape can prevent dropout). Two of the retaining parts 32 are formed at a predetermined interval in the pipe axial direction.

The two retaining parts 32 are effective as parts that prevent water from invading even if the water invades from the outside temporarily. The retaining parts 32 of the present embodiment are effective as parts that raise the rigidity of the straight pipe parts 29. Of course, the straight pipe parts 29 which are hard to be deformed contribute to the prevention of water invasion.

In FIGS. 2 to 5, the irregular portion 22 has the first irregular pipe part 25, the second irregular pipe part 26 and the shape converting part 27, as described above. The first irregular pipe part 25 corresponds to the flexible pipe part 23, and the second irregular pipe part 26 corresponds to the flexible pipe part 24. The first irregular pipe part 25 and the second irregular pipe part 26 are formed into irregular shapes. The shape converting part 27 is formed as a part to link the first irregular pipe part 25 and the second irregular pipe part 26. The shape converting part 27 is formed as a part which converts shape from the first irregular pipe part 25 to the second irregular pipe part 26 (from the second irregular pipe part 26 to the first irregular pipe part 25). Furthermore, the shape converting part 27 is formed as a part which extends a predetermined length in the pipe axial direction to straightly wire the wire harness 9 at this part.

The first irregular pipe part 25 is formed into a bellows pipe shape. The first irregular pipe part 25 is formed to have a round cross section. That is, the first irregular pipe part 25 is formed into a round corrugated tube. Because the first irregular pipe part 25 has the above shape, the first irregular pipe part 25 can be bent to various directions. The first irregular pipe part 25 is so arranged that one end of the first irregular pipe part 25 follows a first linking pipe part 34 of the shape converting part 27 to be described below. Further, the first irregular pipe part 25 is formed and arranged so that the other end of the first irregular pipe part 25 follows the straight pipe part 29. The first irregular pipe part 25 is formed to have a minimum necessary inside space (a round inside space) which is minimum necessary for the high voltage electrical pathway 16 to be inserted.

The second irregular pipe part 26 is formed into a bellows pipe shape. The second irregular pipe part 26 is formed to be different in shape from the first irregular pipe part 25. In the present embodiment, the second irregular pipe part 26 is formed to have an oval cross section. That is, the second irregular pipe part 26 is formed into a flat corrugated tube. Because the second irregular pipe pan 26 has the above shape, the second irregular pipe part 26 is formed into such a shape that unlike the first irregular pipe part 25, the second irregular pipe part 26 becomes slightly hard to be bent in a predetermined direction. The second irregular pipe part 26 is so arranged that one end of the second irregular pipe part 26 follows the other end of the shape convening part 27 to be described below. Further, the second irregular pipe part 26 is formed and arranged so that the other end of the second irregular pipe part 26 follows the straight pipe part 28. The second irregular pipe part 26 is formed to have a minimum necessary inside space (an oval inside space) which is minimum necessary for the high voltage electrical pathway 16 to be inserted.

The shape converting part 27 is not formed into a bellows pipe shape unlike the first irregular pipe part 25 and the second irregular pipe part 26. That is, the shape converting part 27 is formed into a non-bellows pipe shape. The shape converting part 27 is formed to have the same function as the straight pipe parts 28, 29.

The shape converting part 27 is formed into the illustrated shape to have a body part 33 and the first linking pipe part 34 in the embodiment. The body part 33 is formed as a part that converts shapes between the first irregular pipe part 25 and the second irregular pipe part 26. As can be seen in the figures, the shape of the body part 33 in the present embodiment is formed by crushing a straight pipe, which is relatively short and has a round cross section, so that one end of the pipe has an oval cross section (the pipe that has a round cross section is gradually crushed to become a pipe that has an oval cross section).

The first linking pipe part 34 is a relatively short straight pipe part to link the first irregular pipe part 25 and is formed to follow one end of the body part 33. The first linking pipe part 34 is formed to have a round cross section. Two reinforcing parts 35 are formed at a predetermined interval on the outer surface of the first linking pipe part 34. The reinforcing parts 35 are formed into annular parts that slightly project from the outer surface of the first linking pipe part 34. The first linking pipe part 34 is formed as a part that makes smooth shape conversion between the first irregular pipe part 25 and the second irregular pipe part 26. In the present embodiment, the second irregular pipe part 26 is directly connected to the other end of the body part 33 (one example. Another example is described below with reference to FIGS. 10A and 10B).

The irregular portions 22 are formed to convert a round cross section of a height into an oval cross section of a lowered height.

In FIGS. 3A and 3B, the high voltage electrical pathway 16 which is accommodated and protected in the above exterior member 15 includes two high voltage circuits 36, a shielding member 37 which covers the two high voltage circuits 36, and a sheath 38 which is provided outside the shielding member 37 (An example. For example, it is also possible not to include the sheath 38).

The high voltage circuit 36 is a well-known high voltage electric wire here, and includes a conductor 39 and an insulator 40 which coats the conductor 39. The high voltage circuit 36 is formed to have a length necessary for electrical connection. Because the wire harness 9 electrically connects the inverter unit 4 and the battery 5 (junction block 12) (refer to FIG. 1), the high voltage circuit 36 is formed into a long one.

The conductor 39 is manufactured of copper, copper alloy, aluminum or aluminum alloy. The conductor 39 may be either a conductor structure in which strands are twisted or a rod-like conductor structure whose cross section is a rectangular shape or a round shape (for example, a conductor structure with a rectangular single core or a round single core, and in this case, the electric wire itself becomes rod-like). The insulator 40 made of insulative resin is extruded onto the outer surface of the above conductor 39.

Although well-known high voltage electric wires are adopted as the high voltage circuits 36 in the present embodiment, the present invention is not limited to this. That is, it is also possible to adopt a high voltage circuit in which a well-known bus bar is provided with an insulator.

The insulator 40 is formed by extruding thermoplastic resin around the outer peripheral surface of the conductor 39. The insulator 40 is formed as a coating of a round cross section. The insulator 40 is formed with a predetermined thickness. Various types of well-known thermoplastic resin can be used as the above thermoplastic resin, and for example, polymer materials such as polyvinyl chloride resin, polyethylene resin and the polypropylene resin are appropriately selected.

The shielding member 37 is an electromagnetic shielding member which collectively covers the two high voltage circuits 36 (a shielding member as a measure against electromagnetic wave), and a well-known web that is formed by weaving a plurality of strands into a pipe shape is adopted. The shielding member 37 is formed to have a length that is almost the same as the full length of the two high voltage circuits 36. One end of the shielding member 37 is connected to the shielding case (not shown) or the like of the inverter unit 4 (refer to FIG. 1) through the above shield connector 17 (refer to FIG. 2). The shielding member 37 may adopt, for example, a metal foil that has conductivity or a member that has the metal foil as long as measures against electromagnetic wave are possible.

The sheath 38 is formed by extruding thermoplastic resin onto the outer peripheral surface of the shielding member 37 (the same thermoplastic resin as the insulator 40 is used). The sheath 38 is formed as a coating of an oval cross section. The sheath 38 is formed with a predetermined thickness. The sheath 38 is disposed to become the outermost layer of the high voltage electrical pathway 16. The terminals of the sheath 38 are so machined that the shielding member 37 is exposed by a predetermined length in the manufacture of the wire harness 9. After the terminals are machined, for example, the sheath 38 becomes slightly longer than the exterior member 15.

Figure 8A:
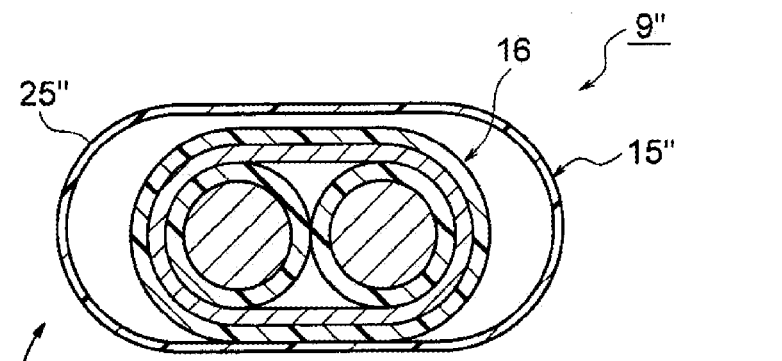
FIGS. 8A to 8C are sectional views which indicate a second variation of the exterior member of FIGS. 3A and 3B (embodiment 3).
Figure 8B:
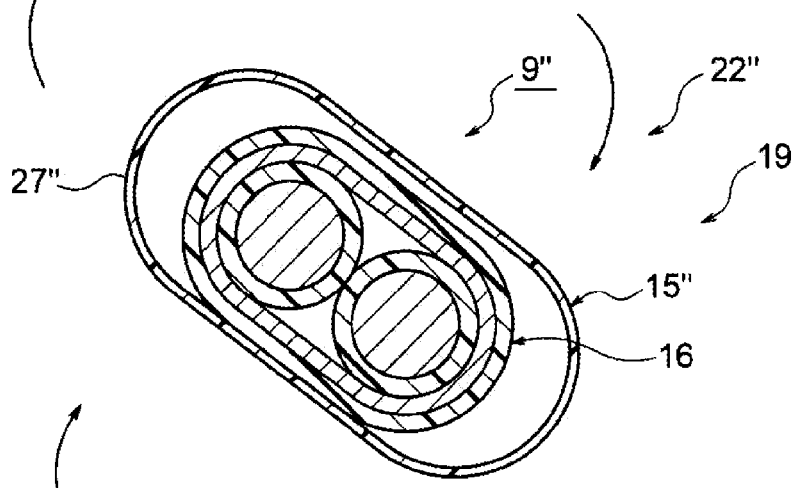
Figure 8C:
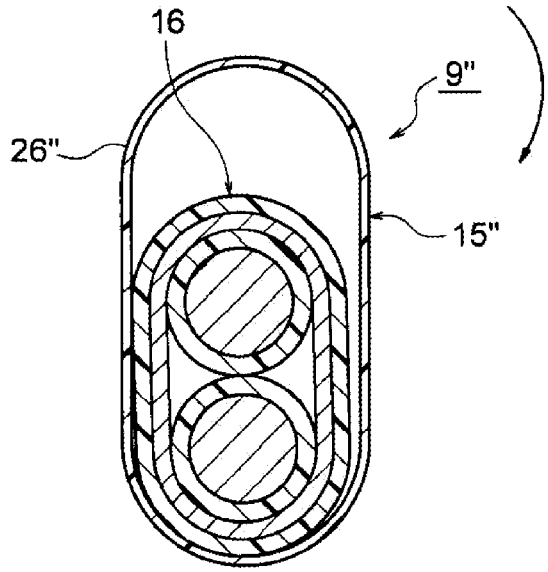

Besides the high voltage electrical pathway 16, an example includes a well-known shielded electric wire (refer to a reference sign 42 of FIGS. 8A-8C). There are one or a plurality of the shielded electric wires. Further, an example includes a high voltage coaxial composite electrical pathway (not shown) which is so constructed that one high voltage coaxial composite electrical pathway has a positive circuit and a negative circuit coaxially or one high voltage coaxial composite electrical pathway has three or more circuits coaxially.

In FIG. 3B, the outer surface of the high voltage electrical pathway 16 surface-contacts a flat inner surface of the exterior member 15 (because the round cross section is converted into the oval cross section by the shape converting part 27, the above flat inner surface is formed). Due to the surface contact, the following effect is played. That is, an effect is played which is that even if relatively large heat is generated by energizing the high voltage electrical pathway 16, the heat is effectively transmitted to the exterior member 15 due to the above surface contact, and dissipated from the outer surface of the exterior member 15.

Back to FIG. 2, a well-known connector is adopted as the shield connector 17. That is, the shield connector 17 includes a terminal metal fitting which is electrically connected to a terminal of the high voltage circuit 36 (refer to FIGS. 3A and 3B), an insulative connector housing which accommodates the terminal metal fitting, a conductive shield shell which is provided at the outside of the connector housing, and a fastening ring made of metal to electrically connect and fix a terminal of the shielding member 37 (refer to FIGS. 3A and 3B) to the shield shell. The shield connector 17 of such a constitution is waterproofed by the boot 18.

The boot 18 is a member to cover the shield connector 17 and the exterior member 15 to prevent water from invading from the outside, and have flexibility. In the present embodiment, a rubber boot 18 is adopted (the material is an example. Other materials that have waterproofness and flexibility are also possible.). The boot 18 is formed into such a shape to adhere to the shield connector 17 and the straight pipe part 29, respectively.

If the boots 18 are not attached, it is also possible to replace the boots 18 with tape windings or the like that have waterproofness.

The wire harness 9 of the above constitution and structure is manufactured as follows (illustration is omitted). That is, the wire harness 9 is manufactured by inserting the high voltage electrical pathway 16 through the exterior member 15 from one end to the other end. Because the whole of the exterior member 15 before use is resin molded into a straight state, the high voltage electrical pathway 16 is inserted straightly. That is, the high voltage electrical pathway 16 is inserted smoothly. Of course, even if the irregular portions 22 exist, because the inner surface of the shape converting part 27 is smooth, the high voltage electrical pathway 16 can be inserted smoothly.

Further, the wire harness 9 is manufactured by providing the shield connectors 17 at the terminal parts of the high voltage electrical pathway 16, respectively. The wire harness 9 is manufactured by attaching a clamp, a grommet, the boots 18 or the like to predetermined positions on the outer surface of the exterior member 15.

After the wire harness 9 is manufactured as described above, a bending operation is performed by folding the flexible pipe parts 23 (24) at predetermined positions. When the packing of the wire harness 9 is completed, the packed wire harness 9 is in a compact state. The wire harness 9 is transported in the compact state to a vehicle assembling spot.

At the vehicle assembling spot, the wire harness 9 is attached to a vehicle from the long part that corresponds to the vehicle floor 11, that is, the straight wiring range 20 (the straight pipe part 28) in the exterior member 15. Because the straight pipe part 28 of the wire harness 9 is arranged at the position corresponding to the vehicle floor 11, the wire harness 9 is attached while flexing is prevented. At this time, the operativity of attaching the wire harness 9 is preferable. After the straight pipe part 28 is fixed to the vehicle floor 11 with clamps or the like, while those parts corresponding to the bendable wiring ranges 19, 19 in the exterior member 15 (flexible pipe part 23, 24) are flexed (bent), the remaining part is attached. When a series of operations concerning the attaching are completed, the wire harness 9 becomes wired along desired courses.

As described with reference to FIGS. 1 to 6 above, according to the wire harness 9, because the exterior member 15 that has the plurality of irregular portions 22 in the pipe axial direction is adopted, if the irregular portions 22 are arranged at the positions of the present embodiment 1, even if wiring space varies at different sites, for example, there is a small space partially (for example, in the embodiment, the vehicle floor 11 whose distance from the floor is short), an effect is played that the wire harness 9 can be wired.

Further, according to the wire harness 9, because the structure that the shape converting part 27 is arranged between the first irregular pipe part 25 and the second irregular pipe pan 26 is adopted in the irregular portion 22, when it is intended to exhibit different flexure performances at the side of the first irregular pipe part 25 and at the side of the second irregular pipe part 26, the high voltage electrical pathway 16 can be fixed at the shape converting part 27. Therefore, an effect is played that the different flexure characteristics before and after the shape converting part 27 can be exhibited in a stable state because of the above fixing.

In addition, the shape converting part 27 in the irregular portion 22 has the body part 33 which is formed as a part that converts shapes between the first irregular pipe part 25 and the second irregular pipe part 26, and has such a shape to link the first irregular pipe part 25 through the first linking pipe pan 34 because the first linking pipe part 34 follows the body part 33. As a result, an effect is played that a smooth shape convening can be made only by the first linking pipe part 34.

Embodiment 2

An embodiment 2 is described with reference to the figures as follows. FIGS. 7A and 7B are sectional views which indicates a first variation of the exterior member of FIGS. 3A and 3B. Components that are substantially identical with those in the above-mentioned embodiment 1 are given identical signs, and their detailed description is omitted.

In FIGS. 7A and 7B, a wire harness 9' according to the present invention includes an exterior member 15', and a high voltage electrical pathway 16 (electrical pathway) which is accommodated and protected in the exterior member 15'. The exterior member 15' is a resin molded article, and is formed with irregular portions 22' which are features of the present invention in ranges that are set as bendable wiring ranges 19 in the exterior member 15'.

The irregular portion 22' has a first irregular pipe part 25', a second irregular pipe part 26', and a shape converting part 27'. The first irregular pipe part 25' and the second irregular pipe pan 26' are formed into irregular shapes in the pipe axial direction. The shape converting part 27' is formed as a part to link the first irregular pipe part 25' and the second irregular pipe part 26'. The shape converting part 27' is formed as a part which converts shape from the first irregular pipe part 25' to the second irregular pipe part 26' (from the second irregular pipe part 26' to the first irregular pipe part 25'). Furthermore, the shape converting part 27' is formed as a part which extends a predetermined length in the pipe axial direction to straightly wire the wire harness 9' at this part.

Both the first irregular pipe part 25' and the second irregular pipe part 26' are formed into a bellow pipe shape of an oval cross section. That is, the first irregular pipe part 25' and the second irregular pipe part 26' are formed into flat corrugated tubes. The difference is that the size of the second irregular pipe pan 26' is different from the size of the first irregular pipe part 25' (the first irregular pipe part 25' is wide and the second irregular pipe part 26' is narrow). On the other hand, the shape convening part 27' is not formed into a bellows pipe shape unlike the first irregular pipe part 25' and the second irregular pipe part 26'. That is, the shape converting part 27' is formed into a non-bellows pipe shape (formed as a part to straightly wire the wire harness 9).

According to the wire harness 9' of the embodiment 2 having the above constitution and structure, the exterior member 15' that has the irregular portion 22' in the pipe axial direction is adopted to make shape converting from a wide width state to a narrow width state. Thus, even if the wiring space varies at different sites, an effect is played that the wire harness 9 can be wired.

Embodiment 3

An embodiment 3 is described with reference to the figures as follows. FIGS. 8A-8C are sectional views which indicate a second variation of the exterior member of FIGS. 3A and 3B. Components that are substantially identical with those in the above-mentioned embodiment 1 are given identical signs, and their detailed description is omitted.

In FIGS. 8A-8C, a wire harness 9" according to the present invention includes an exterior member 15", and a high voltage electrical pathway 16 (electrical pathway) which is accommodated and protected in the exterior member 15". The exterior member 15" is a resin molded article, and is formed with irregular portions 22" which are features of the present invention in ranges that are set as bendable wiring ranges 19 in the exterior member 15".

The irregular portion 22" has a first irregular pipe part 25", a second irregular pipe part 26", and a shape converting part 27". The first irregular pipe part 25" and the second irregular pipe part 26" are formed into irregular shapes in the pipe axial direction. The shape converting part 27" is formed as a part to link the first irregular pipe part 25" and the second irregular pipe part 26". The shape converting part 27" is formed as a part which converts shape from the first irregular pipe part 25" to the second irregular pipe part 26" (from the second irregular pipe part 26" to the first irregular pipe part 25"). Furthermore, the shape converting part 27" is formed as a part which extends a predetermined length in the pipe axial direction to straightly wire the wire harness 9" at this part.

Both the first irregular pipe part 25" and the second irregular pipe part 26" are formed into a bellow pipe shape of an oval cross section. That is, the first irregular pipe part 25" and the second irregular pipe part 26" are formed into flat corrugated tubes. The difference is that the first irregular pipe part 25" is horizontally long but the second irregular pipe part 26" is vertically long (irregular shapes whose sizes are the same, but whose directions are different). On the other hand, the shape converting part 27" is not formed into a bellows pipe shape unlike the first irregular pipe part 25" and the second irregular pipe part 26". That is, the shape converting part 27" is formed into a non-bellows pipe shape (formed as a part to straightly wire the wire harness 9). In the embodiment 3, the shape converting part 27" is formed into a part that converts shape by a twist.

According to the wire harness 9' of the embodiment 3 having the above constitution and structure, the exterior member 15" that has the irregular portion 22" in the pipe axial direction is adopted to make shape converting from a horizontally long shape to a vertically long shape. Thus, even if the wiring space varies at different sites, an effect is played that the wire harness 9 can be wired.

Embodiment 4

Figure 9A:
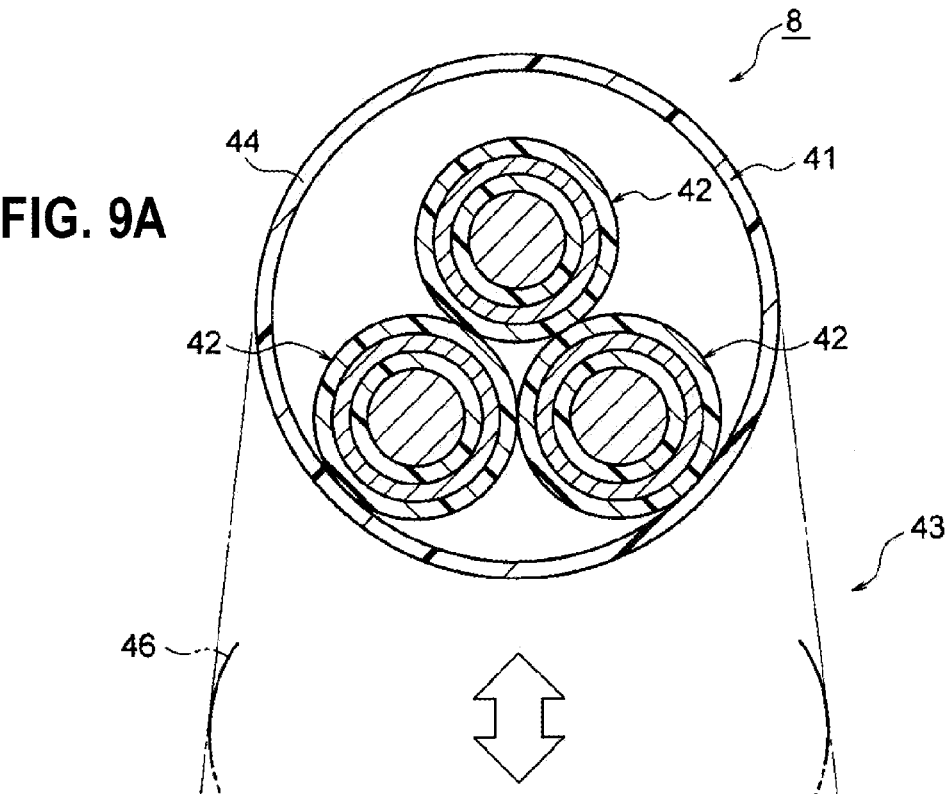
FIGS. 9A and 9B are sectional views which indicate a wire harness of another example (embodiment 4).
Figure 9B:
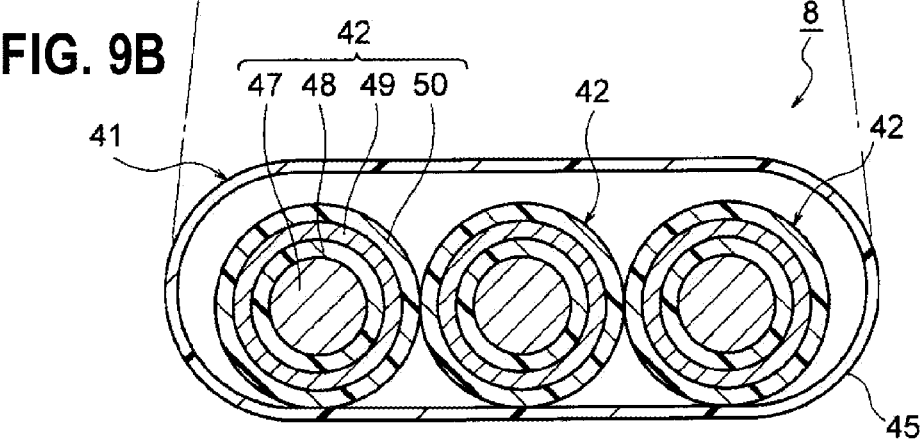

An embodiment 4 is described with reference to the figures as follows. FIGS. 9A and 9B are sectional views which indicate a wire harness of another example.

In FIGS. 9A and 9B, the high voltage wire harness 8 which electrically connects the motor unit 3 and the inverter unit 4 (refer to FIG. 1) is given as an example. The wire harness 8 is called as a motor cable, and includes an exterior member 41 made of resin, and three shielded electric wires 42 (electrical pathways) which are accommodated and protected in the exterior member 41. The exterior member 41 is a feature of the present invention, and has an irregular portion 43.

The irregular portion 43 has a first irregular pipe part 44, a second irregular pipe part 45, and a shape converting part 46. The first irregular pipe part 44 and the second irregular pipe part 45 are formed into irregular shapes in the pipe axial direction. The shape converting part 46 is formed as a part to link the first irregular pipe part 44 and the second irregular pipe part 45. The shape converting part 46 is formed as a part which converts shape from the first irregular pipe part 44 to the second irregular pipe part 45 (from the second irregular pipe part 45 to the first irregular pipe part 44). Furthermore, the shape converting part 46 is formed as a part which extends a predetermined length in the pipe axial direction to straightly wire the wire harness 8 at this part.

The first irregular pipe part 44 is formed into a bellows pipe shape of a round cross section. That is, the first irregular pipe part 44 is formed into a round corrugated tube. The second irregular pipe part 45 is formed into a bellows pipe shape of an oval cross section. That is, the second irregular pipe part 45 is formed into a flat corrugated tube. On the other hand, the shape converting part 46 is not formed into a bellows pipe shape unlike the first irregular pipe part 44 and the second irregular pipe part 45. That is, the shape converting part 46 is formed into a non-bellows pipe shape (formed as a part to straightly wire the wire harness 8). In the embodiment 4, the shape converting part 46 is formed so that it is possible to convert shape like the embodiment 1.

The shielded electric wire 42 includes a conductor 47, an insulator 48 which covers the conductor 47, a shielding member 49 which covers the insulator 48, and a sheath 50 which is provided on the outside of the shielding member 49. A well-known shielded electric wire is adopted as the shielded electric wire 42 (an example).

According to the wire harness 8 of the embodiment 4 having the above constitution and structure, like the embodiment 1, an effect is played that it is possible to wire the wire harness 8 even if the wiring space varies at different sites.

Embodiment 5

An embodiment 5 is described with reference to the figures as follows. FIGS. 10A and 10B are sectional views which indicate various variations of the irregular portions of FIGS. 5A and 5B. Components that are substantially identical with those in the above-mentioned embodiment 1 are given identical signs, and their detailed description is omitted.

In FIG. 10A, an irregular portion 51 has the first irregular pipe part 25, the second irregular pipe part 26 and a shape converting part 52. The shape converting part 52 only includes the same body part 33 as that in the embodiment 1. That is, the shape converting part 52 is formed so that the first irregular pipe part 25 follows one end of the body part 33 and the second irregular pipe part 26 follows the other end of the body part 33. Of course, the present invention is effective even if the irregular portion 51 is adopted.

In FIG. 10B, an irregular portion 53 has the first irregular pipe part 25, the second irregular pipe part 26 and a shape converting part 54. The shape converting part 54 includes the body part 33 like the embodiment 1 and a second linking pipe part 55. That is, the shape converting part 54 is formed so that the first irregular pipe part 25 connects one end of the body part 33 and the second irregular pipe part 26 connects the other end of the body part 33 through the second linking pipe part 55. Of course, the present invention is effective even if the irregular portion 53 is adopted.

In addition, although not particularly illustrated, the present invention is also effective if a shape converting part which connects one end of the body part 33 through the first linking pipe part 34 (refer to FIGS. 5A and 5B) and connects the other end of the body part 33 through the second linking pipe part 55 is adopted.

It is apparent that various modifications can be made to the invention without changing the purpose of the invention.

A wire harness includes an electrical pathway and an exterior member. The exterior member is formed into a pipe-like shape by being resin molded, and is formed into a bellows pipe shape at harness terminal corresponding parts. A terminal in the harness terminal corresponding parts is formed into a straight pipe part of a round cross section whose shape is converted from the bellows pipe shape. A waterproofing member is attached to adhere to the outer surface of the straight pipe part. The waterproofing member is fixed with a fastening member such as a tape or a band.

Embodiment 6

Figure 11:
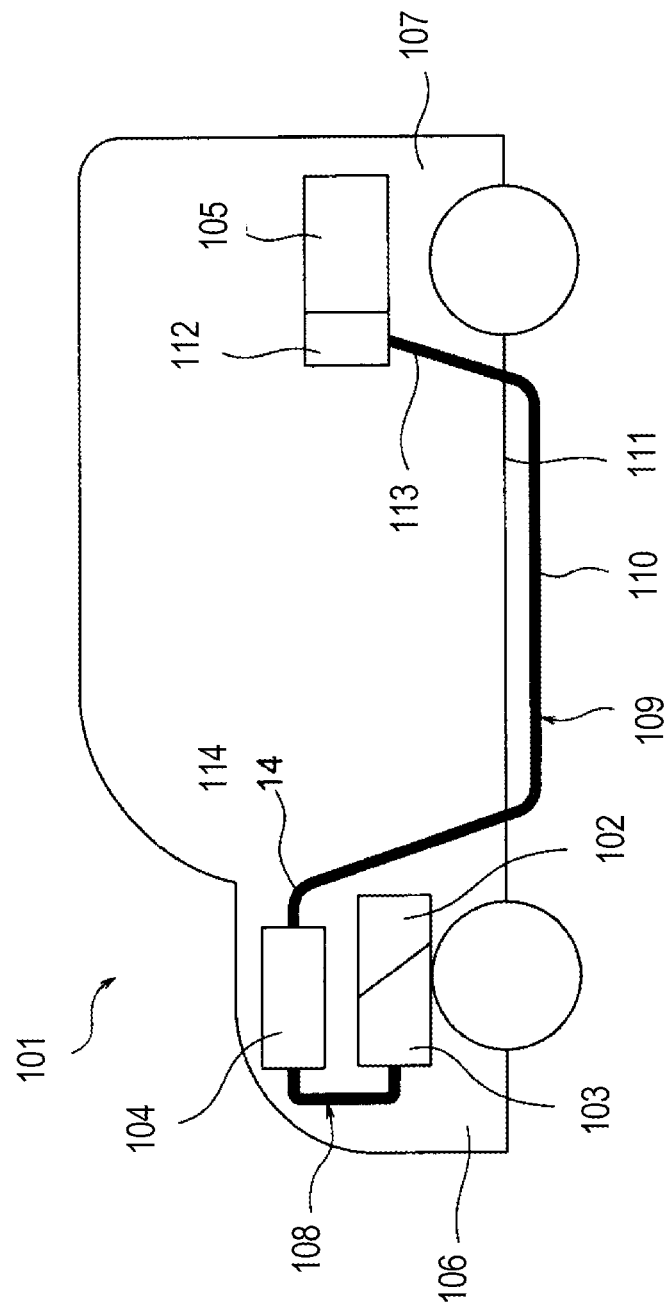
FIG. 11 is a schematic view which shows that a wire harness of the present invention is wired (embodiment 6).
Figure 13:
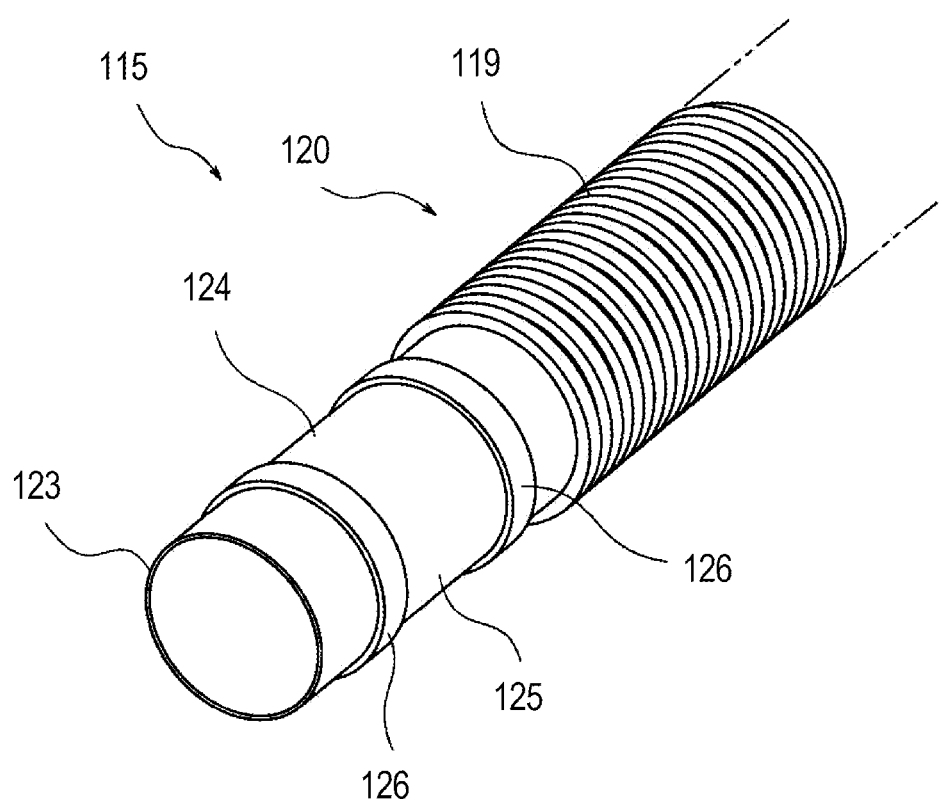
FIG. 13 is an enlarged perspective view which indicates a variation of the terminal of the exterior member.
Figure 14:
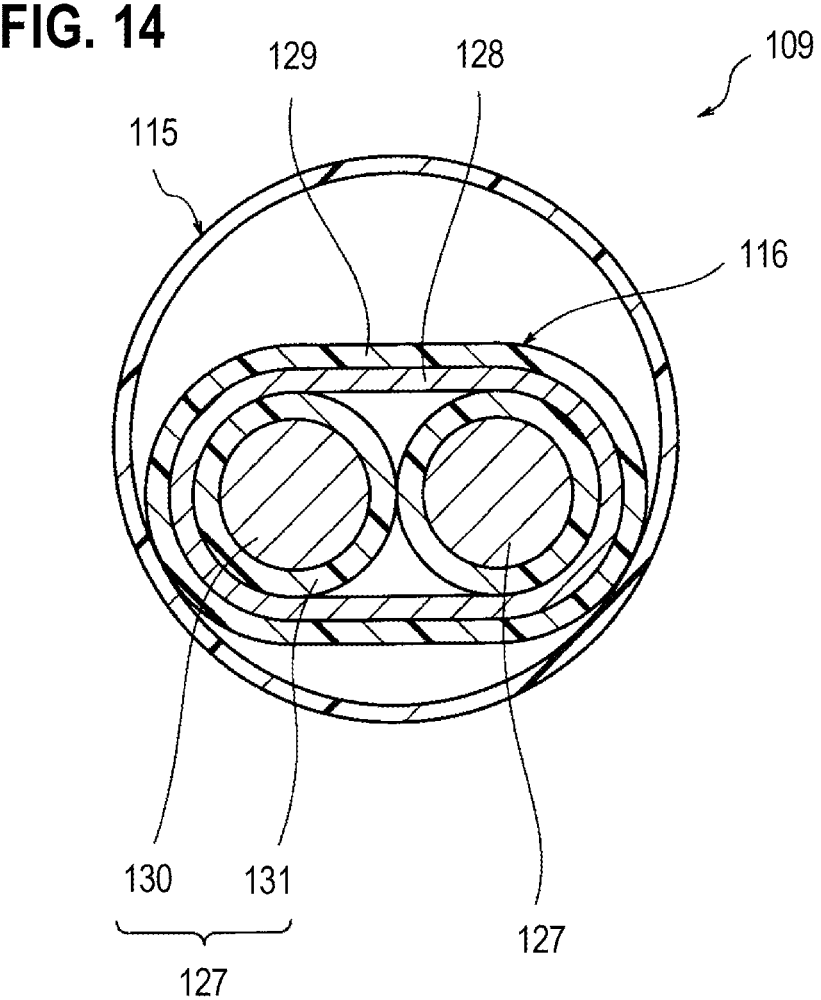
FIG. 14 is an H-H line sectional view of FIGS. 12A and 12B.

An embodiment 6 is described with reference to the figures as follows. FIG. 11 is a schematic view which indicates that a wire harness of the present invention is wired. FIG. 12A is a top view which indicates the constitution of the wire harness, and FIG. 12B is an enlarged perspective view of a terminal of an exterior member. FIG. 13 is an enlarged perspective view which indicates a variation of the terminal of the exterior member. FIG. 14 is an H-H line sectional view of FIG. 12.

In the present embodiment, the present invention is applied to a wire harness which is wired in a hybrid vehicle (or an electric vehicle or a general vehicle).

In FIG. 11, a reference sign 101 indicates a hybrid vehicle. The hybrid vehicle 101 is a vehicle which is driven by mixing two powers of an engine 102 and a motor unit 103, and the electric power from a battery 105 (battery pack) will be supplied to the motor unit 103 via an inverter unit 104. The engine 102, the motor unit 103 and the inverter unit 104 are carried in an engine room 106 at the position of front wheels and the like in the embodiment. The battery 105 is carried in a vehicle rear part 107 of rear wheels and the like (it is also possible that the battery 5 is carried in a vehicle indoor room which is behind the engine room 106).

The motor unit 103 and the inverter unit 104 are connected by a high voltage wire harness 108. The battery 105 and the inverter unit 104 are also connected by a high voltage wire harness 109. A middle part 110 of the wire harness 109 is wired below a vehicle floor 111. The wire harness 109 is wired substantially in parallel with the vehicle floor 111. The vehicle floor 111 is a well-known body and is a so-called panel member, and through holes are formed at predetermined positions. The wire harness 109 is inserted through these through holes watertightly.

The wire harness 109 and the battery 105 are connected through a junction block 112 which the battery 105 is provided with. A back end 113 of the wire harness 109 is electrically connected to the junction block 112 with a well-known method. A front end 114 of the wire harness 109 is electrically connected to the inverter unit 104 with a well-known method.

The motor unit 103 includes a motor and a generator in structure. The inverter unit 104 includes an inverter and a converter in structure. The motor unit 103 is formed as a motor assembly including a shielding case. The inverter unit 104 is also formed as an inverter assembly including a shielding case. The battery 105 is a Ni-MH battery or Li-ion battery, and is modulated. Further, for example, an electric power storage device such as a capacitor may be used. The battery 105 shall not be particularly limited as long as the battery 5 may be used for the hybrid vehicle 101 or an electric vehicle.

In FIG. 12, the wire harness 109 according to the present invention includes an exterior member 115, a high voltage electrical pathway 116 (electrical pathway) which is accommodated and protected in the exterior member 115, shield connectors 117 which are provided at the above front end 114 and the above back end 113 which are harness terminals, boots 118 (waterproofing members) which are provided at the front end 114 and the back end 113, and a plurality of clamps (fixing members whose illustration is omitted) which are attached to the outer surface of the exterior member 115, and a grommet (waterproofing member whose illustration is omitted) which is watertightly attached to the outer surface of the exterior member 115.

Further, the wire harness 109 may have such a structure and constitution that a low voltage electrical pathway is accommodated and protected in the exterior member 115 together with the high voltage electrical pathway 116.

The exterior member 115 is formed into a single straight pipe-like shape by being resin molded (straight before use). The exterior member 115 is formed with a plurality of flexible pipe parts 119 which have flexibility. The flexible pipe parts 119 in the figure are shown to be arranged and formed at harness terminal corresponding parts 120. The flexible pipe parts 119 are formed into a bellows pipe shape of a round cross section. Specifically, the flexible pipe parts 119 are formed to have circumferential furrows 121 and ridges 122, which alternate in the pipe axial direction.

Straight pipe parts 124 that become terminals 123 of the exterior member 15 follow the flexible pipe parts 119. The shape of the straight pipe parts 124 are converted from the bellows pipe shape of the flexible pipe parts 119 into a shape of a round cross section. The straight pipe parts 124 are formed as parts to which the boots 118 are attached. Because the straight pipe parts 124 are the parts to which the boots 118 are attached, the straight pipe parts 124 are formed relatively short in the pipe axial direction. The straight pipe parts 124 are formed as parts which do not have the flexibility of the flexible pipe parts 119. The straight pipe parts 124 are formed as parts which have rigidity so that the straight pipe parts 124 will not deform even if the boots 118 are attached.

The outer surfaces of the straight pipe parts 124 are formed as adhering surfaces 125 to make the boots 118 adhere to. The adhering surfaces 125 are formed as smooth surfaces. The adhering surfaces 125 may be formed with retaining parts 126 as shown in FIG. 13. The retaining parts 126 are formed into annular parts that slightly project from the adhering surfaces 125 (it is only an example, but not particularly limited as long as the shape can prevent dropout). Two of the retaining parts 126 are formed at a predetermined interval in the pipe axial direction.

The two annular retaining parts 126 are effective as parts that prevent water from invading even if the water invades from the outside temporarily. In addition, the retaining parts 126 are effective as parts that raise the rigidity of the straight pipe parts 124. Of course, the straight pipe parts 124 which are hard to be deformed contribute to the prevention of water invasion. Although not particularly illustrated, after the boots 118 are attached to the straight pipe parts 124, when the boots 118 are fastened and fixed, for example, with fastening members such as band members at positions between the two retaining parts 126, water is effectively prevented from invading.

In the present embodiment, the exterior member 115 is formed into such a shape that slits are not provided (there are no cuts) along the pipe axial direction. A reason that the slits are not provided is to improve waterproofness by preventing water from invading into the exterior member 115. Another reason is that the high voltage electrical pathway 116 would not protrude, for example, from the flexed parts. Besides, a further reason is to improve the rigidity of the exterior member 115 itself. In addition, the exterior member 115 is formed into such a shape that there are no circumferential seams. The reasons are similar to those of the above slits.

The exterior member 115 may be formed into such a shape that the exterior member 15 can be divided at predetermined positions if the above points can be satisfied. In this case, the exterior member 115 is unified by bonding or welding or by appended members for connecting.

In FIG. 14, the high voltage electrical pathway 116 which is accommodated and protected in the above exterior member 115 includes two high voltage circuits 127, a shielding member 128 which covers the two high voltage circuits 127, and a sheath 129 which is provided outside the shielding member 128 (An example. For example, it is also possible not to include the sheath 129).

The high voltage circuit 127 is a well-known high voltage electric wire here, and includes a conductor 130 and an insulator 131 which coats the conductor 130. The high voltage circuit 127 is formed to have a length necessary for electrical connection. Because the wire harness 109 electrically connects the inverter unit 104 and the battery 105 (junction block 112) (refer to FIG. 11), the high voltage circuit 127 is formed into a long one.

The conductor 130 is manufactured of copper, copper alloy, aluminum or aluminum alloy. The conductor 130 may be either a conductor structure in which strands are twisted or a rod-like conductor structure whose cross section is a rectangular shape or a round shape (for example, a conductor structure with a rectangular single core or a round single core, and in this case, the electric wire itself becomes rod-like). The insulator 131 made of insulative resin is extruded onto the outer surface of the above conductor 130.

Although well-known high voltage electric wires are adopted as the high voltage circuits 127 in the present embodiment, the present invention is not limited to this. That is, it is also possible to adopt a high voltage circuit in which a well-known bus bar is provided with an insulator.

The insulator 131 is formed by extruding thermoplastic resin around the outer peripheral surface of the conductor 130. The insulator 131 is formed as a coating of a round cross section. The insulator 131 is formed with a predetermined thickness. Various types of well-known thermoplastic resin can be used as the above thermoplastic resin, and for example, polymer materials such as polyvinyl chloride resin, polyethylene resin and the polypropylene resin are appropriately selected.

The shielding member 128 is an electromagnetic shielding member which collectively covers the two high voltage circuits 127 (a shielding member as a measure against electromagnetic wave), and a well-known web that is formed by weaving a plurality of strands into a pipe shape is adopted. The shielding member 128 is formed to have a length that is almost the same as the full length of the two high voltage circuits 127. One end of the shielding member 128 is connected to the shielding case (not shown) or the like of the inverter unit 104 (refer to FIG. 11) through the above shield connector 117 (refer to FIG. 2). The shielding member 128 may adopt, for example, a metal foil that has conductivity or a member that has the metal foil as long as measures against electromagnetic wave are possible.

The sheath 129 is formed by extruding thermoplastic resin onto the outer peripheral surface of the shielding member 128 (the same thermoplastic resin as the insulator 131 is used). The sheath 129 is formed as a coating of an oval cross section. The sheath 129 is formed with a predetermined thickness. The sheath 129 is disposed to become the outermost layer of the high voltage electrical pathway 116. The terminals of the sheath 129 are so machined that the shielding member 128 is exposed by a predetermined length in the manufacture of the wire harness 109. After the terminals are machined, for example, the sheath 129 becomes slightly longer than the exterior member 115.

Besides the high voltage electrical pathway 116, an example includes a well-known shielded electric wire (not shown). There are one or a plurality of the shielded electric wires. Further, an example includes a high voltage coaxial composite electrical pathway (not shown) which is so constructed that one high voltage coaxial composite electrical pathway has a positive circuit and a negative circuit coaxially or one high voltage coaxial composite electrical pathway has three or more circuits coaxially.

Back to FIG. 12, a well-known connector is adopted as the shield connector 117. That is, the shield connector 117 includes a terminal metal fitting which is electrically connected to a terminal of the high voltage circuit 127 (refer to FIG. 14), an insulative connector housing which accommodates the terminal metal fitting, a conductive shield shell which is provided at the outside of the connector housing, and a fastening ring made of metal to electrically connect and fix a terminal of the shielding member 128 (refer to FIG. 14) to the shield shell. The shield connectors 117 of such a constitution is waterproofed by the boot 118.

The boot 118 is a member to cover the shield connector 117 and the exterior member 115 to prevent water from invading from the outside, and have flexibility. In the present embodiment, a rubber boot 118 is adopted (the material is an example. Other materials that have waterproofness and flexibility are also possible.). The boot 118 is formed into such a shape to adhere to the shield connector 117 and the adhering surfaces 125 of the straight pipe part 124, respectively. As waterproofing members besides the boot 118, an example includes a grommet.

The wire harness 109 of the above constitution and structure is manufactured as follows (illustration is omitted). That is, the wire harness 109 is manufactured by inserting the high voltage electrical pathway 116 through the exterior member 115 from one end to the other end. Because the whole of the exterior member 115 before use is resin molded into a straight state, the high voltage electrical pathway 116 is inserted straightly. That is, the high voltage electrical pathway 116 is inserted smoothly. Further, the wire harness 109 is manufactured by providing the shield connectors 117 at the terminal parts of the high voltage electrical pathway 116, respectively. The wire harness 109 is manufactured by attaching a clamp, a grommet, the boots 118 or the like to predetermined positions on the outer surface of the exterior member 115. On attaching the boots 118, for example, fastening members such as tapes or bands may be used to fix.

As described with reference to FIGS. 11 to 14, because the wire harness 109 includes the exterior member 115 made of resin whose terminals 123 become the straight pipe parts 124 whose shape is converted from the bellows pipe shape into a shape of a round cross section, the boots 118 can be adhered at more surfaces. Therefore, in comparison with the terminals of the traditional bellows pipe shape, the adherence with the waterproofing members such as the boots 118 can be improved. By the present invention, preventive measures against water invasion at the terminals 123 of the exterior member 115 are enough.

Embodiment 7

Figure 15A:
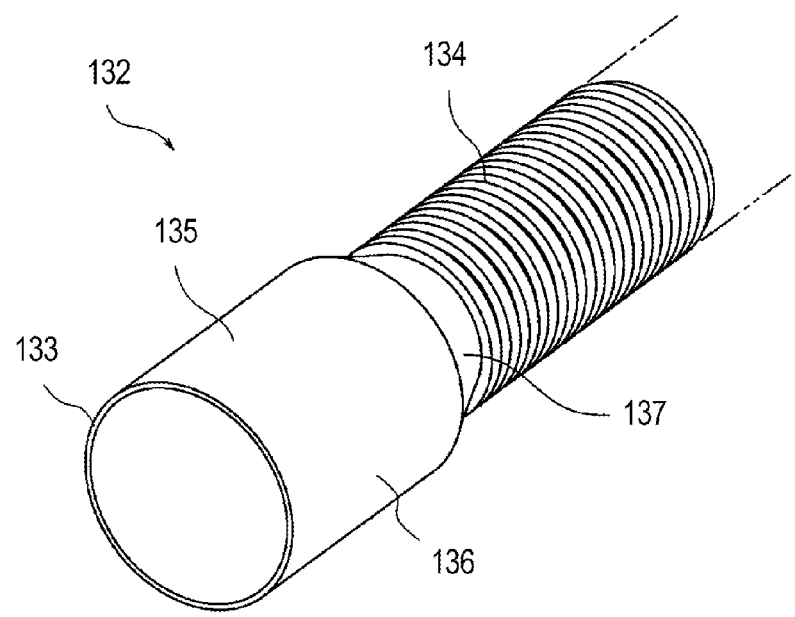
Figure 15B:
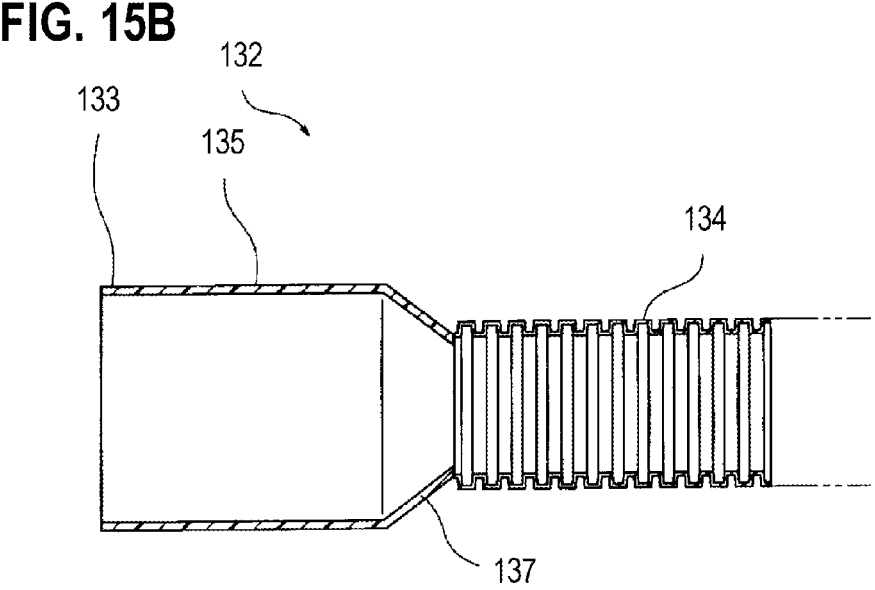

An embodiment 7 is described with reference to the figures as follows. FIGS. 15A and 15B include figures which indicate a variation of the terminal of the exterior member, in which FIG. 15A is an enlarged perspective view, and FIG. 15B is a sectional view of FIG. 15A. Components that are substantially identical with those in the above-mentioned embodiment 6 are given identical signs, and their detailed description is omitted.

In FIGS. 15A and 15B, a terminal 133 of an exterior member 132 is formed as the following part. That is, a straight pipe part 135 is formed whose shape is converted from a flexible pipe part 134 which has a bellows pipe shape of a round cross section. The straight pipe part 135 is formed to have a round cross section. The straight pipe part 135 is formed as an attaching part to which a waterproofing member (a boot, a grommet or the like) not shown is attached. The straight pipe part 135 is formed relatively short in the pipe axial direction. The straight pipe part 135 of the present embodiment is formed to have a diameter larger than that of the flexible pipe part 134.

The straight pipe part 135 is formed as a part which does not have the flexibility of the flexible pipe part 134. The straight pipe part 135 is formed as a part which has rigidity so that the straight pipe part 135 will not deform even if a waterproofing member is attached. The outer surface of the straight pipe part 135 is formed as an adhering surface 136 to make the waterproofing member adhere to. The adhering surface 136 is formed as a smooth surface (the retaining part 126 in the embodiment 6 may be provided). A reference sign 137 indicates a shape converting part that converts shape.

Of course, an effect like the embodiment 6 is played even if the above exterior member 132 is included. That is, the adherence with the waterproofing member can be improved.

Embodiment 8

Figure 16A:
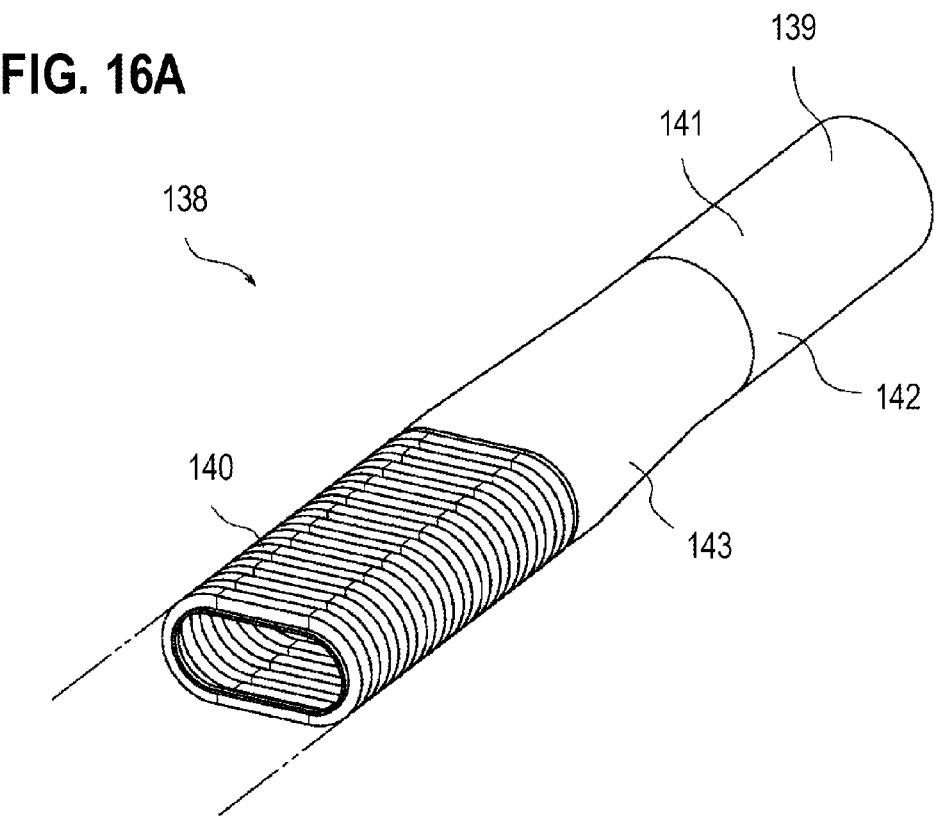
Figure 16B:
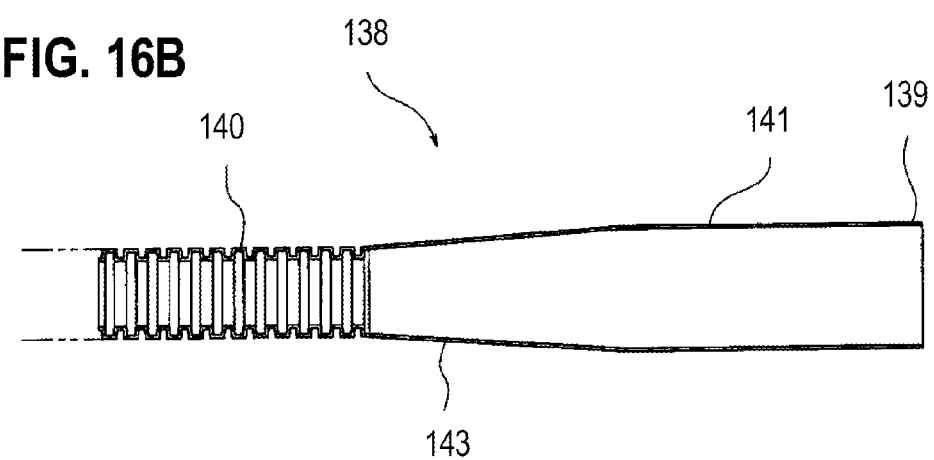

An embodiment 8 is described with reference to the figures as follows. FIGS. 16A and 16B include figures which indicate a variation of the terminal of the exterior member, in which FIG. 16A is an enlarged perspective view, and FIG. 16B is a sectional view of FIG. 16A. Components that are substantially identical with those in the above-mentioned embodiment 6 are given identical signs, and their detailed description is omitted.

In FIGS. 16A and 16B, a terminal 139 of an exterior member 138 is formed as the following part. That is, a straight pipe part 141 is formed whose shape is converted from a flat flexible pipe part 140 which has a bellows pipe shape of an oval (or elliptical) cross section. The straight pipe part 141 is formed to have a round cross section. The straight pipe part 141 is formed as an attaching part to which a waterproofing member (a boot, a grommet or the like) not shown is attached. The straight pipe part 141 is formed relatively short in the pipe axial direction.

The straight pipe part 141 is formed as a part which does not have the flexibility of the flexible pipe part 140. The straight pipe part 141 is formed as a part which has rigidity so that the straight pipe part 141 will not deform even if a waterproofing member is attached. The outer surface of the straight pipe part 141 is formed as an adhering surface 142 to make the waterproofing member adhere to. The adhering surface 142 is formed as a smooth surface (the retaining part 126 in the embodiment 6 may be provided). A reference sign 143 indicates a shape converting part that converts shape.

Of course, an effect like the embodiment 6 is played even if the above exterior member 138 is included. That is, the adherence with the waterproofing member can be improved.

In addition, it is apparent that various modifications can be made to the present invention without changing the purpose of the present invention.

What is claimed is:

1. A wire harness comprising:
    a plurality of electrical pathways or a plurality of circuits of electrical pathways; and
    an exterior member into which the electrical pathways are inserted and which protects the electrical pathways,
    wherein the exterior member is made of resin and has a single pipe-like shape, and has at least one of irregular portions in a pipe axial direction, the irregular portion has:
    a first irregular pipe part;
    a second irregular pipe part which is different in shape from the first irregular pipe part; and
    a shape converting part which links the first irregular pipe part and the second irregular pipe part, and
    the shape converting part is formed as a part which extends a predetermined length in the pipe axial direction to straightly wire the wire harness.

2. The wire harness according to claim 1, wherein the difference in shape is at least one of a difference in cross section, a difference in size and a difference in twisting direction.

3. The wire harness according to claim 1, wherein the shape converting part has a body part as a part to convert shape, and directly links the first irregular pipe part at one end of the body part, or links the first irregular pipe part through a first linking pipe part which is formed at one end of the body part.

4. The wire harness according to claim 3, wherein the shape converting part directly links the second irregular pipe part at the other end of the body part, or links the second irregular pipe part through a second linking pipe part which is formed at the other end of the body part.

5. The wire harness according to claim 1, wherein the irregular portions are formed in ranges where the wire harness has flexibility and is bendably wired.

6. A wire harness comprising:
an electrical path-way; and
an exterior member into which the electrical pathway is inserted, which protects the electrical pathway, which is made of resin and has a pipe-like shape, and which has a bellows pipe shape at harness terminal corresponding parts,
wherein a terminal in the harness terminal corresponding parts is formed into a straight pipe part of a round cross section whose shape is converted from the bellows pipe shape.

7. The wire harness according to claim 6, wherein a waterproofing member is attached to adhere to the outer surface of the straight pipe part, and is fixed with a fastening member.

8. The wire harness according to claim 7, wherein a retaining part of the waterproofing member is formed on the outer surface of the straight pipe part.

\* \* \* \* \*